US012182170B2

(12) United States Patent
Beznos et al.

(10) Patent No.: US 12,182,170 B2
(45) **Date of Patent: *Dec. 31, 2024**

(54) UNIVERSAL ANALYTICAL DATA MART AND DATA STRUCTURE FOR SAME

(71) Applicant: HARTFORD FIRE INSURANCE COMPANY, Hartford, CT (US)

(72) Inventors: Vladislav Michael Beznos, Longmeadow, MA (US); Lynne C. Clark, Bristol, CT (US); Arthur Paul Drennan, III, West Granby, CT (US); David J. Kuethman, Wethersfield, CT (US); William C. Lewis, Avon, CT (US); Fred A. Robinson, East Hartford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,214

(22) Filed: Oct. 25, 2022

(65) Prior Publication Data

US 2023/0056883 A1 Feb. 23, 2023

Related U.S. Application Data

(63) Continuation of application No. 16/831,676, filed on Mar. 26, 2020, now Pat. No. 11,487,790, which is a (Continued)

(51) Int. Cl.
*G06F 16/25* (2019.01)
*G06F 16/28* (2019.01)

(Continued)

(52) U.S. Cl.
CPC .......... *G06F 16/285* (2019.01); *G06F 16/254* (2019.01); *G06Q 20/102* (2013.01); *G06Q 40/08* (2013.01)

(58) Field of Classification Search
CPC ... G06F 16/285; G06F 16/254; G06Q 20/102; G06Q 40/08

(Continued)

(56) References Cited

U.S. PATENT DOCUMENTS

| | | | |
|---|---|---|---|
| 6,718,022 | B1 | 4/2004 | Ehrlich |
| 7,003,504 | B1 | 2/2006 | Angus |

(Continued)

FOREIGN PATENT DOCUMENTS

| | | | |
|---|---|---|---|
| AU | 2014274609 | A1 | 1/2015 |
| EP | 3115959 | B1 | 6/2020 |

(Continued)

OTHER PUBLICATIONS

Sutapat Thiprungsri and Miklos A. Vasarhelyi. Cluster Analysis for Anomaly Detection in Accounting Data: An Audit Approach. The International Journal of Digital Accounting Research vol. 11, 2011, pp. 69-84. (Year: 2011).

(Continued)

*Primary Examiner* — Hanh B Thai
(74) *Attorney, Agent, or Firm* — VOLPE KOENIG

(57) ABSTRACT

A device and method are described for a universal analytical data mart and data structure for same. The analytical data mart (ADM) associated data structure is designed to allow data from disparate sources to be integrated, enabling streamlined business intelligence, reporting and ad hoc analysis. Conceptually, the ADM enables analytics and business intelligence from multiple frames of reference including people, such as parties and actors including individuals and organizations, places, such as addresses with geographic information at various levels of view, objects, such as insured properties, automobiles and machinery, and events, milestones which happen at points in time and provide analytical/business value.

20 Claims, 39 Drawing Sheets

Related U.S. Application Data continuation of application No. 15/228,739, filed on Aug. 4, 2016, now Pat. No. 10,628,456, which is a continuation-in-part of application No. 14/928,367, filed on Oct. 30, 2015, now Pat. No. 10,942,929, and a continuation-in-part of application No. 14/928,043, filed on Oct. 30, 2015, now Pat. No. 11,244,401.

(51) Int. Cl.
*G06Q 20/10* (2012.01)
*G06Q 40/08* (2012.01)

(58) Field of Classification Search
USPC .......................................................... 707/737
See application file for complete search history.

(56) References Cited

U.S. PATENT DOCUMENTS 7,739,133 B1 6/2010 Hail
7,813,944 B1 10/2010 Luk et al.
7,849,048 B2 * 12/2010 Langseth .............. G06F 16/254 707/602
7,912,842 B1 * 3/2011 Bayliss ................. G06F 16/215 707/749
7,966,204 B1 6/2011 Hail
8,266,148 B2 9/2012 Guha
8,762,180 B2 6/2014 Ghani
8,849,676 B2 9/2014 Goldstein
9,009,161 B2 * 4/2015 Harvey ................... G06F 16/25 707/737
9,026,551 B2 5/2015 Drennan, III
9,069,725 B2 6/2015 Jones
9,111,212 B2 8/2015 Jones
9,213,983 B2 12/2015 Martin
9,223,832 B2 12/2015 Hamborg
10,003,560 B1 6/2018 Perkins
10,169,715 B2 1/2019 Dirac
10,318,882 B2 6/2019 Brueckner
10,339,465 B2 7/2019 Steele
10,452,992 B2 10/2019 Lee
2002/0099563 A1 7/2002 Adendorff
2002/0184133 A1 * 12/2002 Zangari .................. G06Q 40/08 705/36 R
2003/0018605 A1 * 1/2003 Policastro ............. G06F 16/283
2004/0117393 A1 * 6/2004 DeMesa ................. G06Q 30/02
2004/0167908 A1 8/2004 Wakefield
2005/0028046 A1 2/2005 McArdle
2005/0120332 A1 6/2005 Martin
2005/0128516 A1 6/2005 Tomita
2006/0004719 A1 1/2006 Lawrence
2006/0136273 A1 6/2006 Zizzamia
2007/0208579 A1 9/2007 Peterson
2007/0299691 A1 12/2007 Friedlander
2008/0162574 A1 * 7/2008 Gilbert ................... G06Q 30/02
2008/0195439 A1 8/2008 Fidlow
2008/0319829 A1 * 12/2008 Hunt .................. G06Q 30/0201 705/7.29
2009/0006156 A1 * 1/2009 Hunt ...................... G06Q 30/02 705/7.11
2009/0018996 A1 * 1/2009 Hunt ...................... G06Q 30/02
2009/0182583 A1 7/2009 Harkensee
2009/0204471 A1 8/2009 Elenbaas
2009/0210256 A1 8/2009 Upadhyayula
2010/0106747 A1 4/2010 Honzal
2010/0169343 A1 7/2010 Kenedy
2010/0211539 A1 * 8/2010 Ho ........................ G06F 16/972 707/602
2011/0004622 A1 * 1/2011 Marson .................. G06Q 10/06 707/812
2011/0054925 A1 3/2011 Ghani
2011/0137917 A1 * 6/2011 Boland ............. G06F 16/24573 707/E17.014
2011/0141136 A1 * 6/2011 Cardno ................. G06T 11/206 345/606
2011/0179066 A1 7/2011 Cardno
2011/0261049 A1 * 10/2011 Cardno .................. G06Q 40/04 345/419
2012/0173289 A1 7/2012 Pollard
2012/0303389 A1 11/2012 Friedman
2013/0046570 A1 2/2013 Miller
2013/0085769 A1 4/2013 Jost et al.
2013/0117255 A1 5/2013 Liu
2013/0198165 A1 8/2013 Cheng
2013/0226623 A1 8/2013 Diana
2013/0238549 A1 9/2013 Aski
2014/0001356 A1 1/2014 Buhot
2014/0012835 A1 1/2014 Cheng
2014/0074560 A1 3/2014 B'Far
2014/0101201 A1 * 4/2014 Yan ....................... G06F 16/283 707/E17.014
2014/0108074 A1 4/2014 Miller
2014/0114840 A1 4/2014 Arnold
2014/0278588 A1 9/2014 Burgoon
2014/0316824 A1 10/2014 Tkatch
2015/0006470 A1 1/2015 Mayur
2015/0026187 A1 1/2015 Ballou
2015/0081324 A1 3/2015 Adjaoute
2015/0127595 A1 5/2015 Hawkins, II
2015/0205856 A1 * 7/2015 Brill ................... G06Q 30/0201 707/737
2015/0205863 A1 7/2015 Drennan
2015/0294422 A1 10/2015 Carver
2015/0310082 A1 * 10/2015 Han ...................... G06F 16/254 707/602
2015/0339364 A1 11/2015 Aoki
2016/0019251 A1 * 1/2016 Marks ................. G06F 16/2282 707/752
2016/0048542 A1 2/2016 Gluzman Peregrine
2016/0063076 A1 3/2016 Martin
2016/0127358 A1 5/2016 Engelking
2016/0259832 A1 * 9/2016 Shore .................. G06F 16/9024
2016/0357839 A1 * 12/2016 Hiltz-Laforge ....... G06F 16/283
2016/0371785 A1 12/2016 Bray
2017/0017886 A1 1/2017 Gao
2017/0124079 A1 * 5/2017 Drennan, III .......... G06N 20/00
2017/0124176 A1 * 5/2017 Beznos ................. G06F 16/285

FOREIGN PATENT DOCUMENTS

KR 101287169 B1 7/2013
WO 02098045 A2 12/2002

OTHER PUBLICATIONS

Yeo et al., Clustering Technique for Risk Classification and Prediction of Claim Costs in the Automobile Insurance Industry, International Journal of Intelligent Systems in Accounting, Finance, and Management, pp. 39-50 (2001).

* cited by examiner

Figures 12A, 12B:
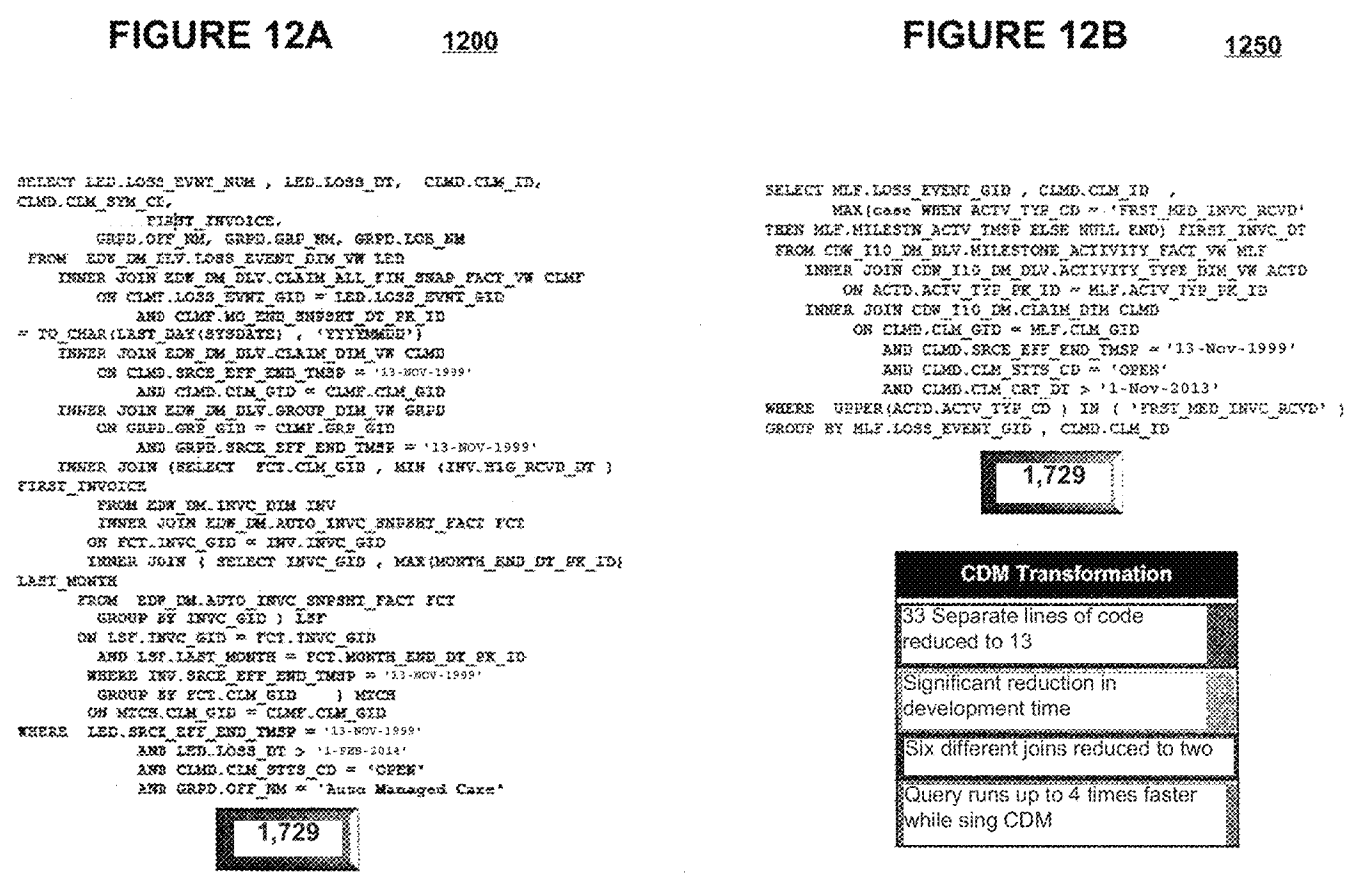

```
SELECT LED.LOSS_EVNT_NUM , LED.LOSS_DT,  CLMD.CLM_ID,
CLMD.CLM_SYM_CI,
              FIRST_INVOICE,
        GRPD.OFF_NM, GRPD.GRP_NM, GRPD.LOS_NM
 FROM  EDW_DM_DLV.LOSS_EVENT_DIM_VW LED
    INNER JOIN EDW_DM_DLV.CLAIM_ALL_FIN_SNAP_FACT_VW CLMF
        ON CLMF.LOSS_EVNT_GID = LED.LOSS_EVNT_GID
            AND CLMF.MO_END_SNPSHT_DT_PK_ID
= TO_CHAR(LAST_DAY(SYSDATE) , 'YYYYMMDD')
    INNER JOIN EDW_DM_DLV.CLAIM_DIM_VW CLMD
        ON CLMD.SRCE_EFF_END_TMSP = '13-NOV-1999'
            AND CLMD.CLM_GID = CLMF.CLM_GID
    INNER JOIN EDW_DM_DLV.GROUP_DIM_VW GRPD
        ON GRPD.GRP_GID = CLMF.GRP_GID
            AND GRPD.SRCE_EFF_END_TMSP = '13-NOV-1999'
    INNER JOIN (SELECT  FCT.CLM_GID , MIN (INV.HIG_RCVD_DT )
FIRST_INVOICE
        FROM EDW_DM.INVC_DIM INV
        INNER JOIN EDW_DM.AUTO_INVC_SNPSHT_FACT FCT
       ON FCT.INVC_GID = INV.INVC_GID
       INNER JOIN ( SELECT INVC_GID , MAX(MONTH_END_DT_PK_ID)
LAST_MONTH
      FROM  EDP_DM.AUTO_INVC_SNPSHT_FACT FCT
        GROUP BY INVC_GID ) LSF
      ON LSF.INVC_GID = FCT.INVC_GID
        AND LSF.LAST_MONTH = FCT.MONTH_END_DT_PK_ID
       WHERE INV.SRCE_EFF_END_TMSP = '13-NOV-1999'
        GROUP BY FCT.CLM_GID    ) MTCH
       ON MTCH.CLM_GID = CLMF.CLM_GID
WHERE  LED.SRCE_EFF_END_TMSP = '13-NOV-1999'
            AND LED.LOSS_DT > '1-FEB-2014'
            AND CLMD.CLM_STTS_CD = 'OPEN'
            AND GRPD.OFF_NM = 'Auto Managed Care'
```

```
SELECT MLF.LOSS_EVENT_GID , CLMD.CLM_ID  ,
       MAX(case WHEN ACTV_TYP_CD = 'FRST_MED_INVC_RCVD'
THEN MLF.MILESTN_ACTV_TMSP ELSE NULL END) FIRST_INVC_DT
 FROM CDW_I10_DM_DLV.MILESTONE_ACTIVITY_FACT_VW MLF
    INNER JOIN CDW_I10_DM_DLV.ACTIVITY_TYPE_DIM_VW ACTD
        ON ACTD.ACTV_TYP_PK_ID = MLF.ACTV_TYP_PK_ID
    INNER JOIN CDW_I10_DM.CLAIM_DIM CLMD
         ON CLMD.CLM_GID = MLF.CLM_GID
             AND CLMD.SRCE_EFF_END_TMSP = '13-Nov-1999'
             AND CLMD.CLM_STTS_CD = 'OPEN'
             AND CLMD.CLM_CRT_DT > '1-Nov-2013'
WHERE  UPPER(ACTD.ACTV_TYP_CD ) IN ( 'FRST_MED_INVC_RCVD' )
GROUP BY MLF.LOSS_EVENT_GID , CLMD.CLM_ID
```

1,729

| CDM Transformation |
|---|
| 33 Separate lines of code reduced to 13 |
| Significant reduction in development time |
| Six different joins reduced to two |
| Query runs up to 4 times faster while sing CDM |

| Date | Model | LOB | Entity_Type | Entity_ID | Norm_Score | Holdback |
|---|---|---|---|---|---|---|
| 6/1/2014 | Subro | Auto | Claim | 12345 | 250 | No |
| 6/1/2014 | Large Loss | WC | Claim | 23456 | 800 | No |
| 6/1/2014 | Large Loss | WC | Claim | 34567 | 750 | No |
| 6/1/2014 | Large Loss | WC | Claim | 45678 | 300 | No |
| 6/1/2014 | Large Loss | WC | Claim | 67890 | 770 | Yes |
| 6/1/2014 | Large Loss | WC | Claim | 78901 | 500 | No |
| 6/1/2014 | Large Loss | WC | Claim | 89012 | 100 | No |
| 6/1/2014 | All | All | Agency | AA123 | 300 | No |

| Date | Model | LOB | Entity_Type | Entity_ID | Norm_Score | Holdback | |
|---|---|---|---|---|---|---|---|
| 6/1/2014 | Subro | Auto | Claim | 12345 | 250 | No | 3220 |
| 6/1/2014 | Large Loss | WC | Claim | 23456 | 800 | No | 3210 |
| 6/1/2014 | Large Loss | WC | Claim | 34567 | 750 | No | |
| 6/1/2014 | Large Loss | WC | Claim | 45678 | 300 | No | 3230 |
| 6/1/2014 | Large Loss | WC | Claim | 67890 | 770 | Yes | 3240 |
| 6/1/2014 | Large Loss | WC | Claim | 78901 | 500 | No | 3250 |
| 6/1/2014 | Large Loss | WC | Claim | 89012 | 100 | No | 3260 |
| 6/1/2014 | ALL | All | Agency | AA123 | 300 | No | 3270 |

| Date | Model | LOB | Entity_Type | Entity_ID | Norm_Score | Holdback | |
|---|---|---|---|---|---|---|---|
| 6/1/2014 | Subro | Auto | Claim | 12345 | 250 | No | 3320 |
| 6/1/2014 | Large Loss | WC | Claim | 23456 | 800 | No | 3310 |
| 6/1/2014 | Large Loss | WC | Claim | 34567 | 750 | No | |
| 6/1/2014 | Large Loss | WC | Claim | 45678 | 300 | No | 3330 |
| 6/1/2014 | Large Loss | WC | Claim | 67890 | 770 | Yes | 3340 |
| 6/1/2014 | Large Loss | WC | Claim | 78901 | 500 | No | 3350 |
| 6/1/2014 | Large Loss | WC | Claim | 89012 | 100 | No | 3360 |
| 6/1/2014 | ALL | All | Agency | AA123 | 300 | No | 3370 |

| Date | Model | LOB | Entity Type | Entity ID | Norm Score | Holdback |
|---|---|---|---|---|---|---|
| 6/1/2014 | Subro | Auto | Claim | 12345 | 250 | No |
| 6/1/2014 | Large Loss | WC | Claim | 23456 | 400 | No |
| 6/2/2014 | Large Loss | WC | Claim | 34567 | 200 | No |
| 6/30/2014 | ALL | All | Agency | AA1234 | 300 | No |
| 6/30/2014 | Large Loss | WC | Claim | 45678 | 750 | Yes |
| 6/30/2014 | Large Loss | WC | Claim | 23456 | 700 | No |
| 7/1/2014 | Large Loss | WC | State | CA | 500 | No |
| 7/1/2014 | Large Loss | WC | Industry | 2215 | 350 | No |

| Date | Model | LOB | Entity Type | Entity ID | Norm Score | Holdback |
|---|---|---|---|---|---|---|
| 6/1/2014 | Subro | Auto | Claim | 12345 | 250 | No |
| 6/1/2014 | Large Loss | WC | Claim | 23456 | 700 | No |
| 6/1/2014 | Large Loss | WC | Claim | 34567 | 200 | No |
| 6/1/2014 | Fraud | WC | Claim | 23456 | 650 | No |
| 6/1/2014 | ALL | All | Agency | AA1234 | 300 | No |
| 6/1/2014 | Large Loss | WC | Claim | 45678 | 750 | Yes |
| 6/1/2014 | Large Loss | WC | Claim | 56789 | 700 | No |
| 6/1/2014 | Large Loss | WC | State | CA | 500 | No |
| 6/1/2014 | Large Loss | WC | Industry | 2215 | 350 | No |

| Date | Model | LOB | Entity Type | Entity ID | Norm Score | Holdback |
|---|---|---|---|---|---|---|
| 6/1/2014 | Large Loss | WC | Claim | 12345 | 250 | No |
| 6/2/2014 | Large Loss | WC | Claim | 23456 | 700 | Yes |
| 6/3/2014 | Large Loss | WC | Claim | 34567 | 200 | No |
| 6/4/2014 | Large Loss | WC | Claim | 23456 | 650 | No |
| 6/5/2014 | Large Loss | WC | Claim | 45678 | 300 | No |
| 6/6/2014 | Large Loss | WC | Policy | BK1234 | 420 | No |
| 6/7/2014 | Large Loss | WC | Policy | BK2345 | 318 | No |
| 6/8/2014 | Large Loss | WC | Policy | BK3456 | 180 | No |
| 6/9/2014 | Large Loss | All | Agency | AA1234 | 350 | No |

UNIVERSAL ANALYTICAL DATA MART AND DATA STRUCTURE FOR SAME

CROSS REFERENCE TO RELATED APPLICATIONS

This application is a continuation of U.S. patent application Ser. No. 16/831,676, filed Mar. 26, 2020, which is a continuation of U.S. patent application Ser. No. 15/228,739, filed Aug. 4, 2016, and issued Apr. 21, 2020, as U.S. Pat. No. 10,628,456, which is a continuation-in-part of U.S. patent application Ser. No. 14/928,043, filed Oct. 30, 2015, and issued Feb. 8, 2022, as U.S. Pat. No. 11,244,401, and is also a continuation-in-part of U.S. patent application Ser. No. 14/928,367, filed Oct. 30, 2015, and issued Mar. 9, 2021, as U.S. Pat. No. 10,942,929, which applications are all incorporated by reference as if fully set forth.

FIELD OF INVENTION

The present invention is related to an analytical data mart system and data structure for same.

BACKGROUND

An entity may want to analyze or "mine" large amounts of data. For example, a company might want to analyze tens of thousands of files to look for patterns (e.g., a particular type of injury has occurred more frequently for employees who work in a particular industry). An entity might analyze this data in connection with different types of applications, and, moreover, different applications may need to analyze the data differently. For example, the term "IV" might referent to an "Insured Vehicle" when it appears in an automobile accident report and to "Intra-Venous" when it appears in a medical file. It can be difficult to identify patterns across such large amounts of data and different types of applications. In addition, manually managing the different needs and requirements (e.g., different business logic rules) associated with different applications can be a time consuming and error prone process. As a result, it would be desirable to provide systems and methods for efficiently and accurately preparing data for analysis, integrating the data to the workflow of the business, and inputting rules of users.

SUMMARY

A device and method are described for a universal analytical data mart and data structure for same. The analytical data mart (ADM) associated data structure is designed to allow data from disparate sources to be integrated, enabling streamlined business intelligence, reporting and ad hoc analysis. Conceptually, the ADM enables analytics and business intelligence from multiple frames of reference including people, such as parties and actors including individuals and organizations, places, such as addresses with geographic information at various levels of view, objects, such as insured properties, automobiles and machinery, and events, milestones which happen at points in time and provide analytical/business value.

A system and method are disclosed. The system and method allow data from disparate sources to be integrated, enabling streamlined business intelligence, reporting and ad hoc analysis. The system and method include a plurality of different data sources providing data stored in a plurality of storage devices, at least one processor for processing data from each of the plurality of different data sources by processing dimensional and fact data from each of the plurality of different data sources, and a database for storing the processed dimensional and fact data from each of the plurality of different data sources as data in a datamart. The data in the datamart provides multiple frames of reference including at least two of people, places, objects, and events.

The system and method allow data from disparate sources to be integrated, enabling streamlined business intelligence, reporting and ad hoc analysis. The system and method include a plurality of different data sources providing data including a plurality of data points stored in a plurality of storage devices, at least one processor for processing data from each of the plurality of different data sources by processing dimensional and fact attributes from each of the plurality of data points wherein the fact attributes are measurable attributes of the data points and the dimensional attributes are descriptors of the fact attributes, and a database for storing the processed dimensional and fact attributes from each of the plurality of data points as data in tables in a datamart and linking the fact attributes back to the provided data including the plurality of data points. The data in the datamart provides multiple frames of reference including at least two of people, places, objects, and events by accessing a fact table for one of the multiple frames of reference the system providing access to the dimensional tables providing descriptors to the accessed fact table and access the linked provided data including the plurality of data points.

BRIEF DESCRIPTION OF THE DRAWINGS

A more detailed understanding may be had from the following description, given by way of example in conjunction with the accompanying drawings wherein:

FIGS. 12A and B collectively illustrate the improvement in code provided by the data structure of the analytical data mart;

FIG. 30 illustrates a data set associated with the scoring mart;

FIG. 31 illustrates an example batch lookup of scores within the scoring mart;

FIG. 32 illustrates an example batch lookup of scores within the scoring mart;

FIG. 33 illustrates an aspect of the scoring mart allowing identifying the speed of change based scores;

FIG. 34 illustrates an aspect of the scoring mart allowing a return of entities with more than one score;

FIG. 35 illustrates an aspect of the scoring mart allowing the aggregation of scores from one entity onto another entity;

DETAILED DESCRIPTION OF THE EMBODIMENTS

Figure 1:
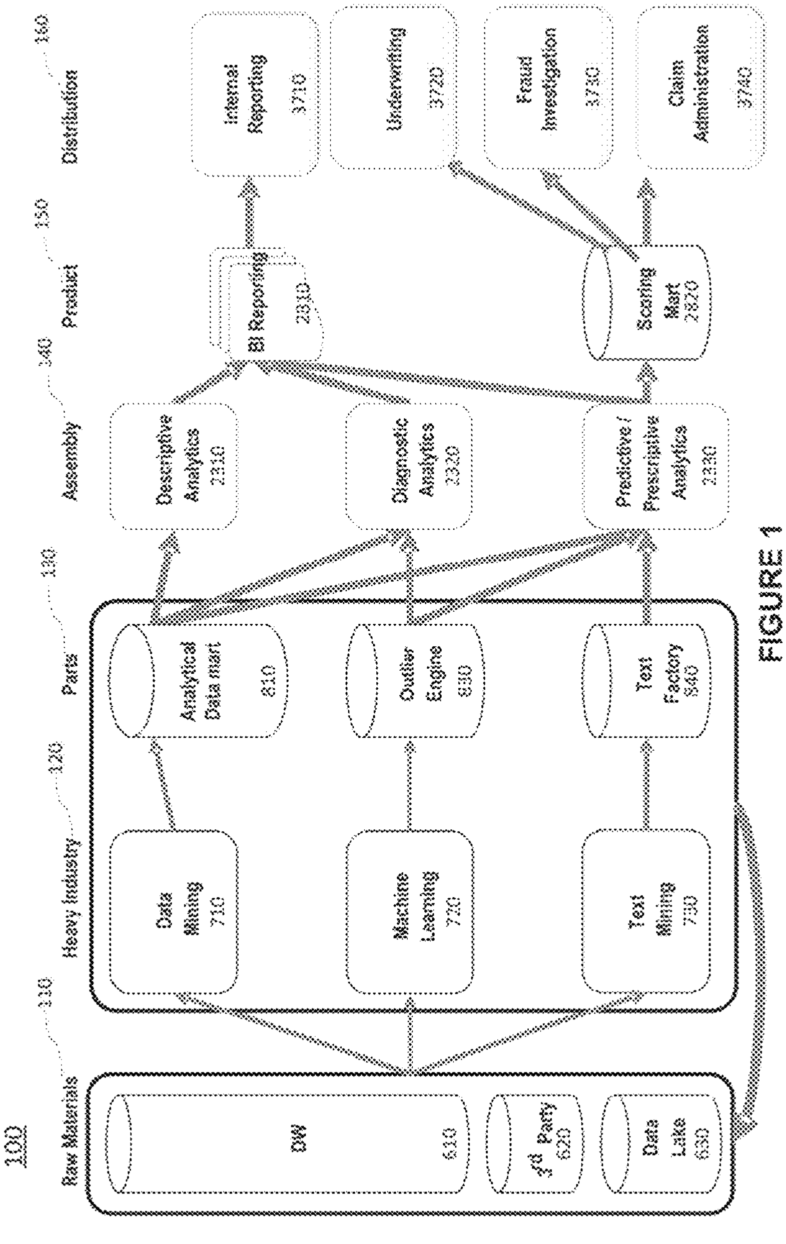
FIG. 1 illustrates a system block diagram of the insight supply chain.

An enterprise may want to analyze or "mine" large amounts of data, such as text data, images, documents, and voice data that may be received from various sources. By way of example, an insurance company might want to analyze tens of thousands of insurance claim text files including images that may be included with a claim to look for patterns (e.g., to find patterns of factors that may help indicate a likely recovery period length will be associated with a particular type of injury). An entity might analyze this data in connection with different types of applications and that different applications may need to analyze the data differently. Relationships and data structure may be desired in order to integrate different sources of data. These relationships and structure may provide easier and less taxing business intelligence and analytics to be performed. In addition, current data is often event-based or at least stored based on an event or series of events. For example, an accident occurred on such a date. The data from such an accident may be stored within the system based on the "accident" event. This type of storage is common and is supported by the mindset that a file may be created, so that a person dealing with the accident is able to collect and organize all information associated with that "accident"—an event. Event-based data lacks the flexibility to support participant-based and location-based analyses.

The present system provides the ability to receive data from disparate sources, seamlessly integrating this data to streamline use of this data in business intelligence, reporting and analysis. The structures of the present system provide users, business intelligence users and analysts, the ability to perform deeper analytics and to do so not only in the event driven configuration, but also on relationships between participants or actors, including policy holders, claimants, attorneys, and medical providers, for example, and location-based relationships.

The present analytical data mart may reduce the technical complexity associated with data sourced from multiple systems without providing de-normalized tables that seek to obviate multi-table queries. Data in the present system may be retained at the lowest grain available. No upstream data may be duplicated in the analytical data mart unless warranted for performance and/or ease-of-use purposes. Database objects and functionality may then continue to grow within the structured analytical data mart.

The present system provides numerous benefits over previous systems including, but not limited to, substantially improved detection capabilities of occurrences in the data, including potential fraud indicators, largely resulting from the actor, location and object-based data structures. In addition, the present system enables improved analyses resulting from the integration of disparate data sources. There is also realized development time and cost savings that result from the streamlined, optimized data structures of the present system. In addition, the present system narrows to a single version of truth allowing for consistent and accurate data results across various user groups that may analyze and work with the data structures.

A device and method are described for a universal analytical data mart and data structure for same. The analytical data mart (ADM) associated data structure is designed to allow data from disparate sources to be integrated, enabling streamlined business intelligence, reporting and ad hoc analysis. Conceptually, the ADM enables analytics and business intelligence from multiple frames of reference including people, such as parties and actors including individuals and organizations, places, such as addresses with geographic information at various levels of view, objects, such as insured properties, automobiles and machinery, and events, milestones which happen at points in time and provide analytical/business value.

A system and method are disclosed. The system and method allow data from disparate sources to be integrated, enabling streamlined business intelligence, reporting and ad hoc analysis. The system and method include a plurality of different data sources providing data stored in a plurality of storage devices, at least one processor for processing data from each of the plurality of different data sources by processing dimensional and fact data from each of the plurality of different data sources, and a database for storing the processed dimensional and fact data from each of the plurality of different data sources as data in a datamart. The data in the datamart provides multiple frames of reference including at least two of people, places, objects, and events.

The system and method allow data from disparate sources to be integrated, enabling streamlined business intelligence, reporting and ad hoc analysis. The system and method include a plurality of different data sources providing data including a plurality of data points stored in a plurality of storage devices, at least one processor for processing data from each of the plurality of different data sources by processing dimensional and fact attributes from each of the plurality of data points wherein the fact attributes are measurable attributes of the data points and the dimensional attributes are descriptors of the fact attributes, and a database for storing the processed dimensional and fact attributes from each of the plurality of data points as data in tables in a datamart and linking the fact attributes back to the provided data including the plurality of data points. The data in the datamart provides multiple frames of reference including at least two of people, places, objects, and events by accessing a fact table for one of the multiple frames of reference. The system providing access to the dimensional tables providing descriptors to the accessed fact table and access the linked provided data including the plurality of data points.

FIG. 1 illustrates a system block diagram of the insight supply chain 100. System 100 includes raw materials 110, heavy industry 120, parts 130, assembly 140, product 150 and distribution 160 with names by way of analogy and not of requirement as discussed herein. As with a supply chain, system 100 begins with raw materials 110. These raw materials 110 may generally include data that may be in one form or another or a myriad of different forms. Raw materials 110 generally refer to data and other information that may be beneficial or provide insight to a business or corporate environment. Generally, the data may be stored within databases and other rigid structures, such as data warehouses 610, data lakes 630 that allow storage of varying forms of data including images, documents, and voice files, for example, and data supplied from third parties 620. Data contained within the insurance industry may include claim documents, policies, doctor reports, images of damage to vehicles, and the like. Data warehouses 610, data from third parties 620, and data lakes 630 are further described with respect to FIG. 6 below.

Raw materials 110, (the data), may be mined by heavy industry 120. Mining the data 710 includes the steps of taking the raw data and manipulating the data into a useable form. This manipulation may include formatting the data, relating the data, and structuring the data as well as other conventional data mining techniques.

Additionally or alternatively, the manipulation may include machine learning 720 which may include pattern recognition of the data. This may include pattern/sequence labeling for a claim contained within the data.

Other mining may include text mining 730. This type of mining includes generally unstructured mining of data in the form of text. Text mining may include analyzing the claim handler narrative where the narrative is written in a free form. Text mining, as will be described in more detail below, may include evaluating text data received from a myriad of potential sources, and aggregating and mapping the data to create composite text input data. Data mining 710, machine learning 720, and text mining 730 are further described with respect to FIG. 7 below.

After the data is mined by heavy industry 120, the data may be staged with parts 130. In a similar fashion to the manufacturing industry, parts 130 become the building blocks for further manufacturing. In the analysis being performed as described herein, parts 130 including the preparation, reorganization and management of the data. This staging may include reorganizing the data to accelerate access to the data. Analytical data mart 810 may be included in the staging. This may include claim notes, documents, social media and call transcripts consolidated based on a specific feature, such as consolidating all of the data surrounding a claim for a car crash. This may include texts by witnesses, police reports, 911 calls, and the like organized based on the automobile claim. Staging may also take the form of analytical analysis of data. This analysis may include the "what if" question, answer and associated analysis.

Staging may also include using an outlier engine 830 on the data to group or isolate data points, and based on relationships within the data conclude additional data about specific data points. For example, if a data point is grouped with other data points and the group includes high doctor bills associated with back injuries, the data point may have attributes associated with it based on the other members of the group. In this example, the grouping may identify a possibility that the duration of doctor visits may also be above a threshold. Data management 810, outlier engine 830 and text factory 840 are further described with respect to FIG. 8 below.

Figure 2:
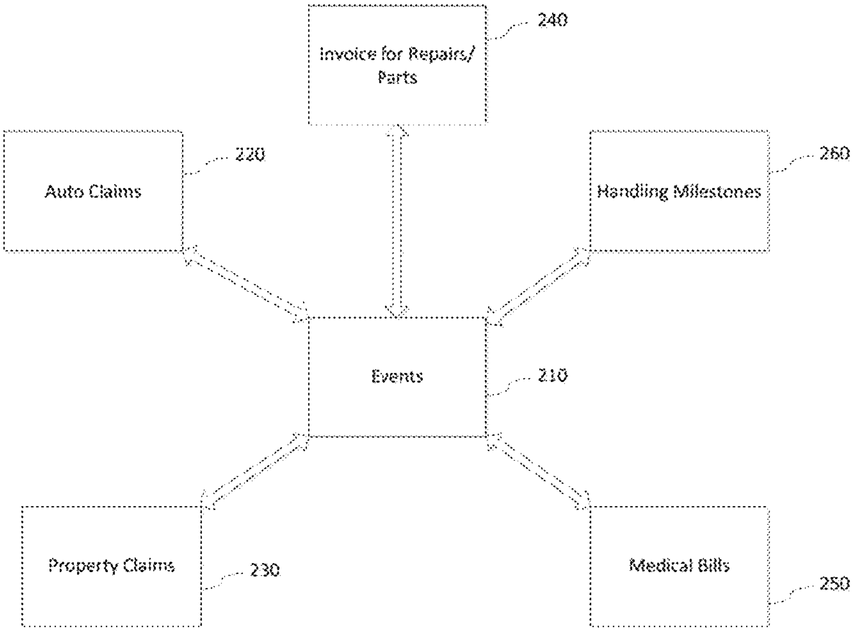
FIG. 2 illustrates data grouped based on exemplary events.

Staging the data includes grouping the mined observations by common central components. For example, and with reference to FIG. 2, there is illustrated data grouped based on exemplary events 210. As may be seen in FIG. 2, the events 210 may be grouped according to auto claims 220 property claims 230, invoices for repairs and parts 240, medical bills 250, and handling milestones 260. Each of auto claims 220, property claims 230, invoices for repairs and parts 240, medical bills 250, and handling milestones 260 may be anchored to a common event 210. Event 210 may be any meaningful concept within the company, for example.

Figure 3:
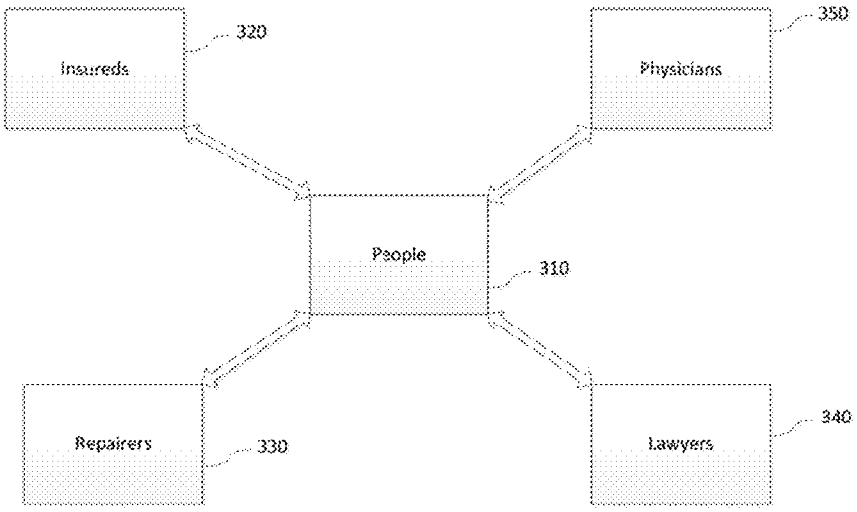
FIG. 3 illustrates data grouped based on exemplary actors.

Further in the example, and with reference to FIG. 3, there is illustrated data grouped based on exemplary actors 310. As may be seen in FIG. 3, people 310 may be grouped according to insureds 320, repairers 330, lawyers 340, and physicians 350. Each of insureds 320, repairers 330, lawyers 340, and physicians 350 may be anchored to a common person 310. Person 310 may be any meaningful concept within the company, for example.

Figure 4:
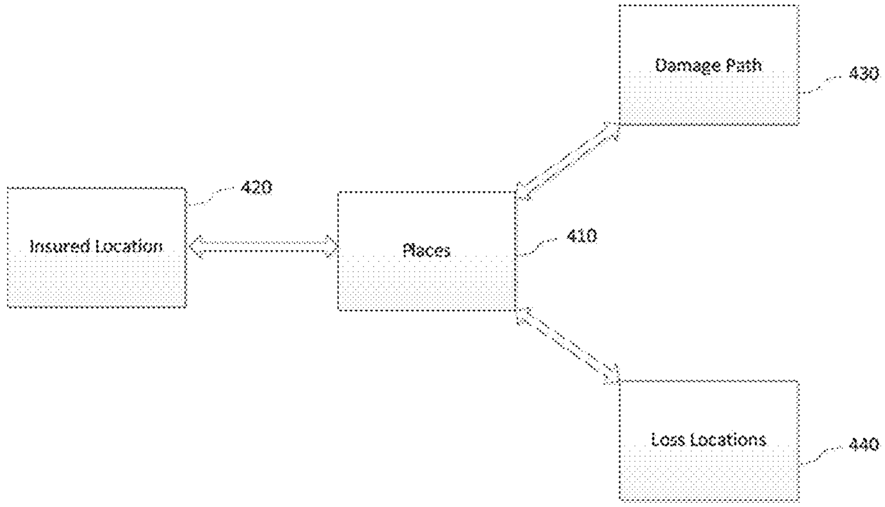
FIG. 4 illustrates data grouped based on exemplary places.

With reference to FIG. 4, there is illustrated data grouped based on exemplary places 410. As may be seen in FIG. 4, places 410 may be grouped according to insured location 420, damage path 430, and loss locations 440. Each of insured location 420, damage path 430, and loss locations 440 may be anchored to a common place 410. Place 410 may be any meaningful concept within the company, for example.

Figure 5:
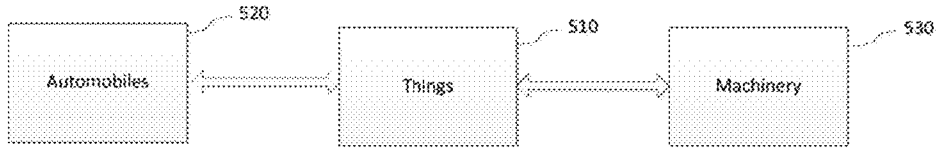
FIG. 5 illustrates data grouped based on exemplary things.

With reference to FIG. 5, there is illustrated data grouped based on exemplary things 510. As may be seen in FIG. 5, things 510 may be grouped according to automobiles 520 and machinery 530. Each of automobiles 520 and machinery 530 may be anchored to things 510. Thing 510 may be any meaningful concept within the company, for example.

Once the data is staged using parts 130, the data may be assembled 140. Assembly of the data includes performing analytics on the data. The analytics may include descriptive analytics 2310 including the management and reporting of the data. This may be relevant to the business intelligence team, the finance group, actuarial data, and product data, for example.

Analytics may also include diagnostics analytics 2320 on the data. Diagnostics analysis of the data may include the "why" and "what if" type of data analysis. This type of data analysis may be relevant in the insurance industry for actuarial forensics, for example.

Predictive/prescriptive analytics 2330 may also be performed on the data. This may include actions that should be taken to prevent something from happening. For example, severe medical issues may be minimized or avoided by having yearly physicals. This type of analytics may be used in forensics research in the insurance industry, for example. Descriptive analytics 2310, diagnostic analytics 2320, and predictive/prescriptive analytics are further described with respect to FIG. 22 below.

Once the data is assembled, it may be packaged as a product 150. The product may include business intelligence reporting 2810 of the assembled data. For example, a trigger based on yearly physicals may provide a discount on the insurance premiums since severe medical issues are reduced by the occurrence of physicals. This type of reporting may include human delivery reporting, for example. Human delivery reporting is the reporting of metrics found in the data in a form to be used by a human. For example, after analyzing data the probability of an event occurring may be reported to a human so that that person may act in a certain way based on the probability. If the likelihood of getting in a car accident is 90% at a certain time, and that information is communicated to a human, it is likely that the human would not travel during that certain time so as to reduce the likelihood of being involved in an accident.

The assembled data may also be packaged via a scoring mart 2820. The scoring mart may provide a machine to machine product that integrates into the workflow of the insurance company. Such workflow input may include being input into rules of users and business rules, for example. Again using the physical example, if the business rules of issuing life insurance are input, a discount based on yearly physicals may automatically be implemented via the scoring mart 2820. Business intelligence reporting 2810 and scoring mart 2820 are further described with respect to FIG. 27 below.

After the product 150 is prepared, the data may be distributed 160 to the various corporate systems. These may include workflow platforms for fraud investigation 3730, underwriting 3720, and claims administration 3740, for example. Again with the physical example, the underwriting system may be provided the product that related to the use of yearly physicals providing a discount in life insurance premiums.

Distribution 160 may also include reporting the product through SharePoint or self-help. This may include a web interface on the insurance company's web page that allows insureds to access information that may provide information on reducing their insurance premiums. In the physical example discussed throughout, the web page may provide the insured information that directs the insured to seek yearly physicals in order to lower their life insurance premium. Internal reporting 3710, underwriting 3720, fraud investigation 3730, and claim administration 3740 are described below with respect to FIG. 36.

Figure 6:
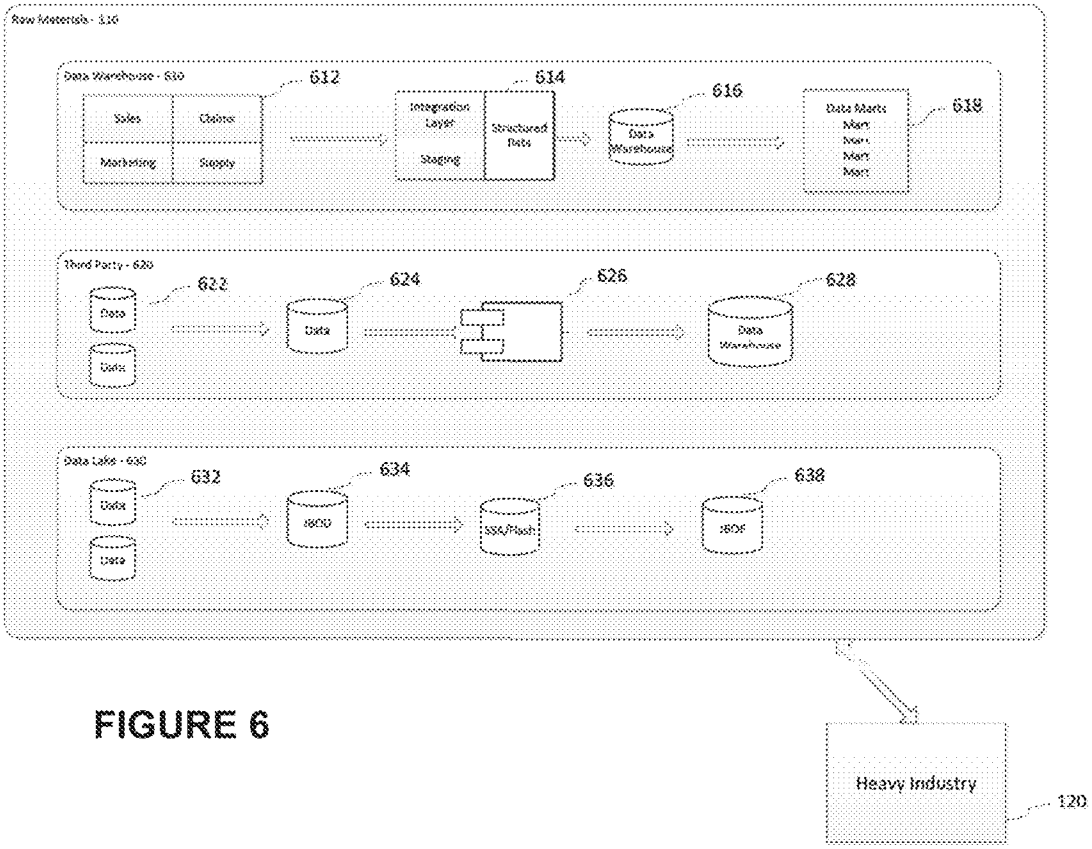
FIG. 6 illustrates several data storage elements for storing raw materials of FIG. 1.

For example, and with reference to FIG. 6, there is illustrated several data storage elements for storing raw materials 110 of FIG. 1. Raw materials 110 may be included in a data warehouse (DW) 610. DW 610, which may also be referred to as an enterprise data warehouse (EDW), is a central repository or repositories of integrated data from one or more disparate sources of data. DW 610 stores current and historical data and may be relied upon to create analytical reports for knowledge workers throughout an enterprise. DW 610 included structured data. Examples of reports could range from annual and quarterly comparisons and trends to detailed daily sales analyses. Generally, the data stored in DW 610 is uploaded from the operational systems, including data from marketing and sales. The data may pass through an operational data store for additional operations before it is used in DW 610. Often DW 610 refers to rigid structure data.

DW 610 may include data from portions of the company 612 that may include sales, claims, marketing, and supply, for example. This raw data may be stored in an integration layer 614 that prepares for staging. The integration layer 614 may output structured data for staging. The data may be held in a data warehouse 616 and stored in data marts 618.

Raw materials 110 may also include third party data 620. Third party data 620 may include any data that is purchased, or comes from outside the system 100. This may include data from external providers and may be aggregated from numerous websites. System 100 may be provided purchased third-party data 620 and data 620 may be shared within system 100.

Third party data 620 may include data that is stored in a data storage device 622. This data may be accumulated in an accessible data device 624. The data may be received via a communication link 626 and stored within the company in a data warehouse 628. Communication link 626 may provide a point-to-point portal or marketplace for third party data and/or aggregated data such as from an aggregator.

Raw materials 110 may also include data stored in a data lake 630. Data lake 630 may include a storage repository or a repository that holds a vast amount of data generally in its native format. While DW 610 stores data in files or folders, data lake 630 may use a flat architecture to store data. Each data element in data lake 630 may be assigned an identifier and tagged with a set of tags. When a business question arises, data lake 630 may be queried for relevant data, and that smaller set of data may then be analyzed to help answer the question. More specifically, data lake 630 houses data that is in large data pool in which the schema and data requirements are not defined until the data is queried.

Data lake 630 may include data storage 632 that holds the data. This data may then be stored in a bunch of disks (JBOD) 634. The data in bunch of disks 634 may be accessed and linked via SSA/flash 636 and stored within a bunch of flash memory (JBOF) 638.

Figure 7:
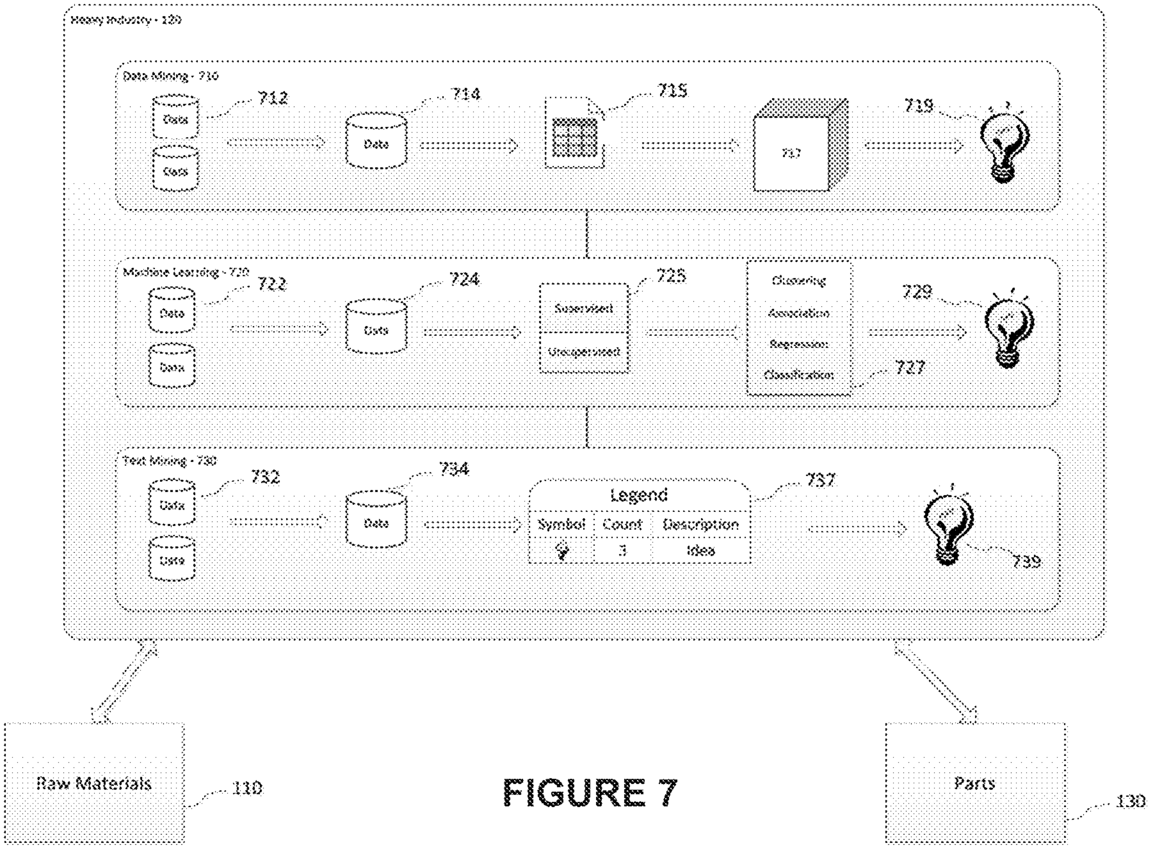
FIG. 7 heavy industry is illustrated as including data mining, machine learning and text mining.

Raw materials 110 are provided to or accessed by heavy industry 120. Referring now also to FIG. 7, heavy industry 120 is illustrated as including data mining 710, machine learning 720 and text mining 730.

Data mining 710 may include the classical types of data manipulation including relational data, formatted and structured data. Data mining 710 generally involves the extraction of information from raw materials 110 and transformation into an understandable structure. Data mining 710 may be performed on the raw materials 110. Data mining 710 may be used to analyze large quantities of data to extract previously unknown, interesting patterns such as groups of data records, unusual records, and dependencies. Data mining involves six common classes of tasks: 1) anomaly detection; 2) dependency modeling; 3) clustering; 4) classification; 5) regression, and 6) summarization.

Anomaly detection, also referred to as outlier/change/deviation detection may provide the identification of unusual data records, that might be interesting or data errors that require further investigation.

Dependency modeling, also referred to as association rule learning, searches for relationships between variables, such as gathering data on customer purchasing habits. Using association rule learning, associations of products that may be bought together may be determined and this information may be used for marketing purposes.

Clustering is the task of discovering groups and structures in the data that are in some way or another "similar", without using known structures in the data.

Classification is the task of generalizing known structure to apply to new data. For example, an e-mail program might attempt to classify an e-mail as "legitimate" or as "spam".

Regression attempts to find a function which models the data with the least error.

Summarization provides a more compact representation of the data set, including visualization and report generation.

Data mining 710 may include data stored in storage devices 712 and accumulated in data 714. This data may be mined and combined in database or table 715, for example. This data may then be correlated in a correlator 717. The correlated data may then be analyzed and reported 719.

Machine learning 720 may include performing pattern recognition on data or data sets contained within raw materials 110. This can be a review for pattern or sequence labels for claims for example. Machine learning explores the construction and study of raw materials 110 using algorithms that can learn from and make predictions on such data. Such algorithms operate using a model such as from example inputs in order to make data-driven predictions or decisions, rather than strictly using static program instructions.

Machine learning 720 may be performed using data stored on a storage device 722. This data may then be accumulated in a storage device 724. Machine learning may then be performed including supervised and unsupervised learning 725. This learning may include processing using clustering, associating, regression analysis, and classifying in a processor 727. The processed data may then be analyzed and reported 729.

Text mining 730 includes using text from raw materials 110 such as claim handling narrative. Generally, text mining 730 involves unstructured fields. Text mining 730 involves the process of deriving high-quality information from text. High-quality information is typically derived through the devising of patterns and trends through means such as statistical pattern learning. Text mining 730 generally involves structuring the input data from raw materials 110, deriving patterns within the structured data, and finally evaluation and interpretation of the output. Text analysis involves information retrieval, lexical analysis to study word frequency distributions, pattern recognition, tagging/annotation, information extraction, data mining techniques including link and association analysis, visualization, and predictive analytics. The overarching goal is, essentially, to turn text into data from raw materials 110 for analysis, via application of natural language processing (NLP) and analytical methods.

Text mining 730 may be performed on data stored on data storage devices 732. This data may be accumulated in data storage 734. The data may be scanned for words or sets of words and the word count may be monitored 737. The monitored and counted data may then be analyzed and reported 739.

A typical application is to scan a set of documents written in a natural language and either model the document set for predictive classification purposes or populate a database or search index with the information extracted.

Figure 8:
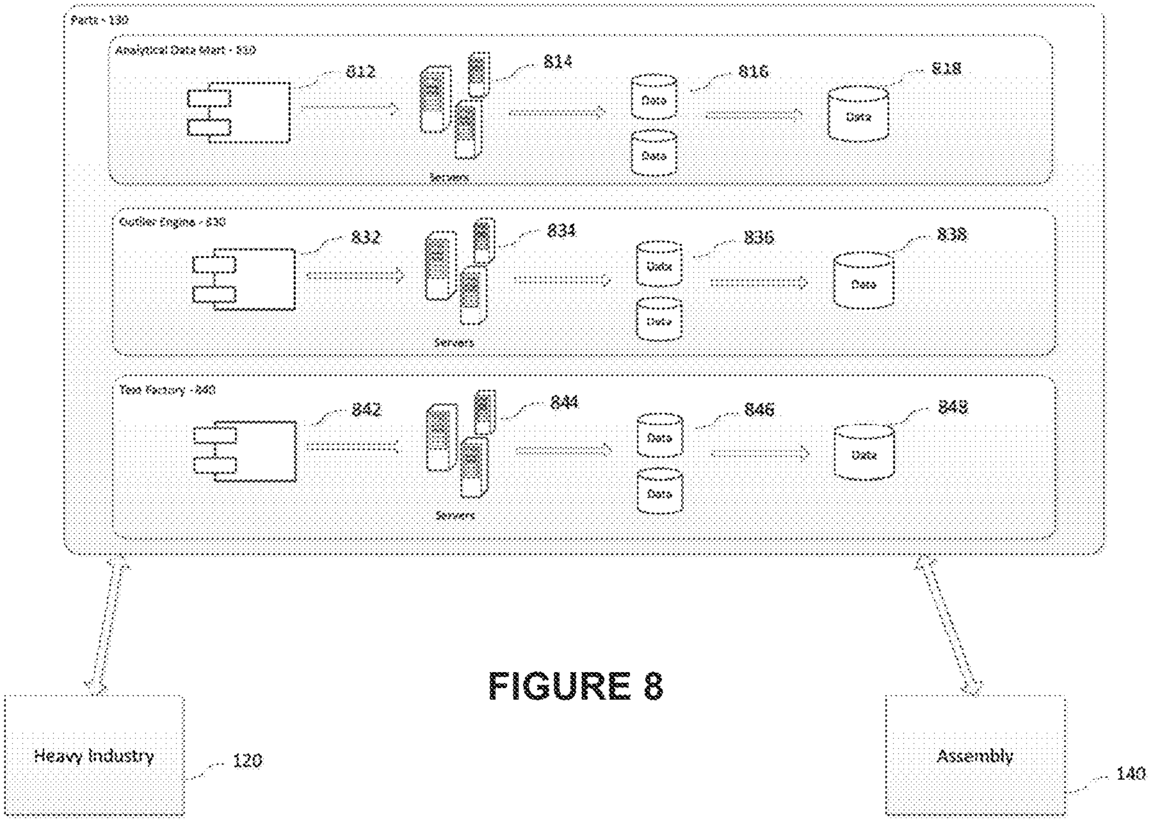
FIG. 8 illustrates that parts may include ADM, ARE, outlier engine and text factory.

Parts 130 may be the staging area for the analytics. For example, in parts 130 the data may be reorganized to accelerate those queries that are frequently requested. Parts 130 may include analytical data mart (ADM) 810, ARE 820, outlier engine 830 and text factory 840 as depicted in FIG. 8.

Analytical data mart, sometimes referred to as ADM and also claims data mart or CDM, 810 may include an interface 812 for receiving data from heavy industry 120. This received data may be processed using processors and servers 814. The processed data, or unprocessed data, may be stored in repository storage 816. The data may then be accumulated on a data storage device 818.

Text factory 840 may include an interface 842 for receiving data from heavy industry 120. This received data may be processed as described herein using processors and servers 844. The processed data, or unprocessed data, may be stored in repository storage 846. The data may then be accumulated on a data storage device 848.

Outlier engine 830 receives data input from a machine learning unit 720 that establishes pattern recognition and pattern/sequence labels for a claim, for example. This may include billing, repair problems, and treatment patterns, for example. This data may be manipulated within outlier engine 830 such as by providing a multiple variable graph as will be described herein below. Outlier engine 830 may provide the ability to identify or derive characteristics of the data, find clumps of similarity in the data, profile the clumps to find areas of interest within the data, generate referrals based on membership in an area of interest within the data, and generate referrals based on migration toward and area of interest in the data. These characteristics may be identified or derived based on relationships with other data points that are common with a given data point. For example, if a data point is grouped with another data point, the attributes of the other data point may be derived to be with the data point. Such derivation may be based on clumps of similarity, for example. Such an analysis may be performed using a myriad of scores as opposed to a single variable.

Outlier engine 830 may include an interface 832 for receiving data from heavy industry 120. This received data may be processed as described herein using processors and servers 834. The processed data, or unprocessed data, may be stored in repository storage 836. The data may then be accumulated on a data storage device 838.

Figure 9:
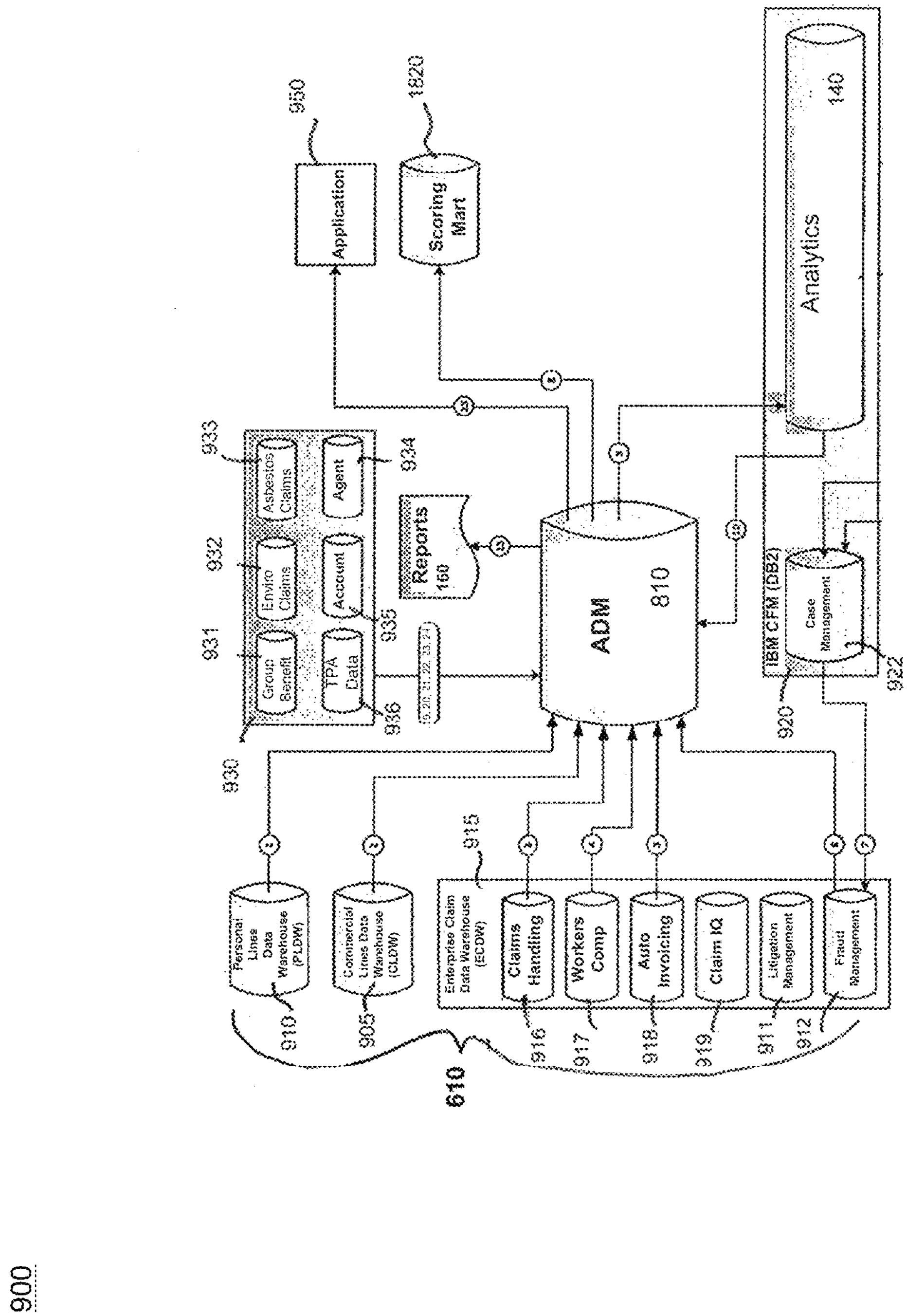
FIG. 9 illustrates a more detailed view of the inputs and outputs of the analytical data mart.

FIG. 9 illustrates a more detailed view 900 of the inputs and outputs of the analytical data mart 810. ADM 810 may have numerous inputs. In order to provide a framework and understanding, an exemplary system surrounding ADM 810 is shown in FIG. 9. ADM 810 receives input data from numerous sources. As shown, ADM 810 has eight inputs. ADM 810 receives data from data warehouses 610. These data warehouses 610 include a personal lines data warehouse 910 and a commercial lines data warehouse 905. Each of these lines data ware houses 905, 910 provide input to ADM 810. In addition, the enterprise data warehouse 915 provides inputs to ADM 810. The enterprise data warehouse 915 includes general information inputs that regularly produce data. The enterprise data warehouse 915 may include claims handling system 916, workers compensation 917, automobile, medical and billing 918, claims information 919, litigation management information 911, and fraud management 912 which receives data from case management 922.

In addition, ADM 810 receives input from a domain of upstream information or data sources 930 which includes group benefit information 931, environmental claims 932, asbestos claims 933, information table 936, account 935, and agent 934. ADM 810 may also receive inputs from analytics 140. These inputs allow ADM 810 to not be a stand-alone database, instead allowing ADM 810 to operate as a fully-integrated component of the data warehouse with foreign key relationships allowing ADM tables/views to be directly joined to data warehouse tables/views found in, for example, claims handling system 916, automobile, medical and billing 918, and workers compensation 917 datamarts.

ADM 810 receives and provides information and feedback from case management 922 including active and real investigations and predictive modeling project 920.

ADM 810 may provide numerous outputs. A shown in FIG. 9, outputs may include feeding data to analytics 140, scoring mart 1820, and applications 950, and outputting reports 160.

Figure 10:
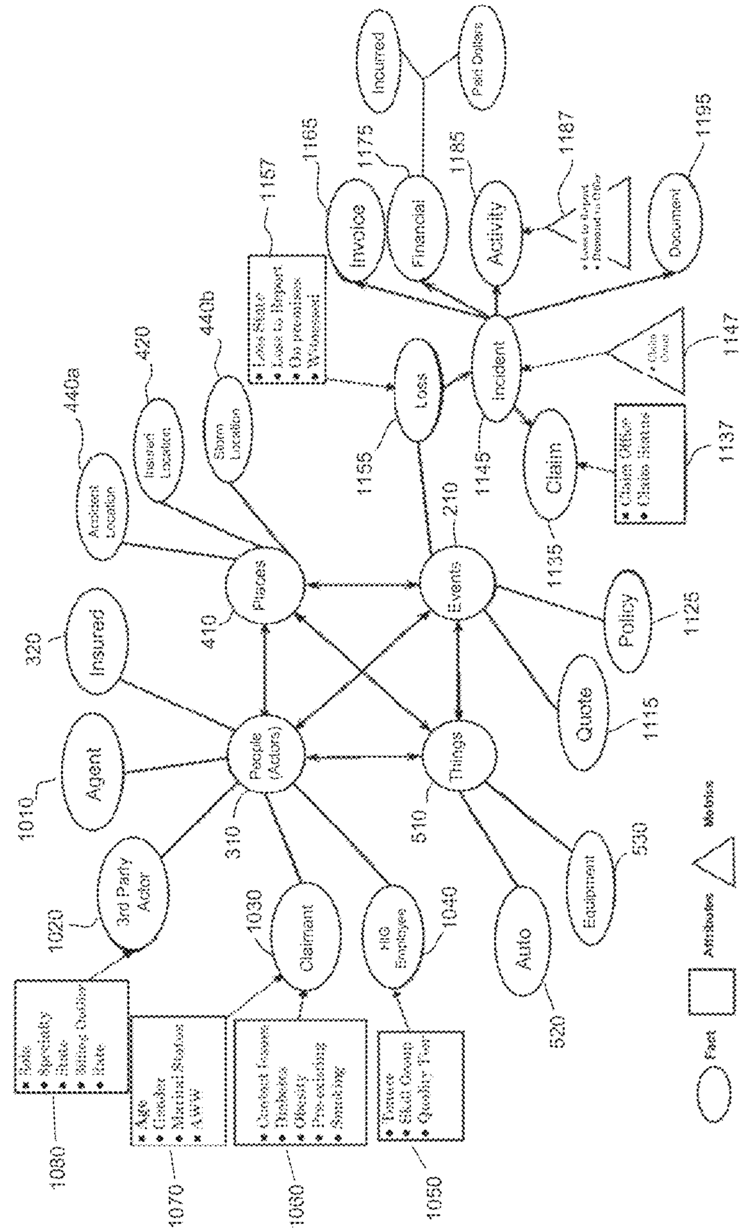
FIG. 10 provides a diagram to illustrate the relationships between types of facts, attributes and metrics in the analytical data mart.

FIG. 10 provides a diagram 1000 to illustrate the relationships between types of facts, attributes and metrics in the analytical data mart. Diagram 1000 illustrates the events 210, people or actors 310, places 410, and things 510. This center portion of the figure including events 210, people 310, places 410, and things 510 provides the interrelationship of the data for the user. As shown in FIG. 10, each of events 210, people 310, places 410, and things 510 are connected to each of the other of events 210, people 310, places 410, and things 510 bi-directionally. These depicted connections represent the benefit afforded by the present data structure providing the ability to view the data from any viewpoint. This enables users to view different views of relationships of information. For example, a user may view a number of workers' compensation claims appearing to be elevated in costs or extending for a much longer duration that the average claims. While on their face the claims appear to be unrelated, the ability to view the data from the point of view of people 310 enables a commonality to be viewed that the same doctor, for example, is treating each of these patients. In this way, information about each of events 210, people 310, places 410, and things 510 may be viewed and analyzed within the present system.

These connection lines between events 210, people 310, places 410, and things 510 are created by the processing of data described herein to create the described data structures which enable the flexible point of view. These processes are described herein with respect to at least FIGS. 11-18.

Diagram 1000 illustrates the relationships between events 210 and other facts providing more information regarding events 210. As depicted, these may include quote 1115, policy 1125, and loss 1155, for example. The loss event 1155 fact may be further defined by additional facts, attributes and metrics. Loss 1155 may include attributes 1157 such as loss state, loss to report, on premises, and witnessed, for example. Loss 1115 may be defined and related to an incident 1145. The incident 1145 may include facts related to a claim 1135, invoice 1165, financial 1175, activity 1185, and document 1195. Each of the respective facts may include additional level facts, such as financial 1175 is illustrated as including underlying facts incurred costs and paid dollars, for example. The incident 1145 may include metrics such as claim count 1147, for example. Claim 1135 may include attributes including claim office and claim status 1137. Activity 1185 may include metrics such as loss to report and demand to offer 1187.

Diagram 1000 illustrates the relationships between people 310 and other facts providing more information regarding people 310. As depicted, these may include company employee 1040 working with the person 310 (identified as The Hartford Insurance Group Employee), claimant 1030, agent 1010, insured 320, 3rd party actor 1020, for example. Company employee 1040 may be defined by attributes including tenure, skill group, and quality tier 1050, for example. Third party actor 1020 may include attributes such as role, specialty, state, billing outlier, and rate 1080, for example. Information and attributes of claimant 1030 may also be included, including age, gender, marital status, and AWW 1070. Claimant 1030 may also be defined by additional attributes related to contact issues, diabetes, obesity, pre-existing, and smoking 1060.

In addition, diagram 1000 illustrates the relationships between places 410 and other facts providing more information regarding places 410. As depicted, these may include accident location 440*a*, insured location 420, and storm location 440*b*, for example.

Diagram 1000 illustrates the relationships between things 510 and other facts providing more information regarding things 510. As depicted, these may include automobile 520, and equipment 530, for example.

Figure 11B:
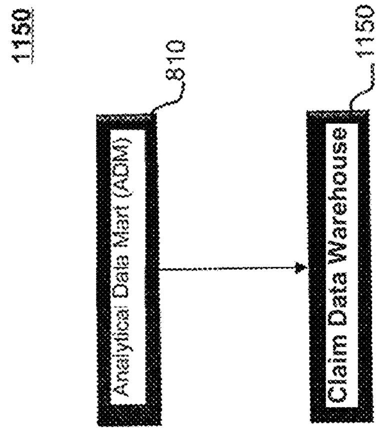
FIGS. 11A and B collectively illustrate an improvement in the data structure of the analytical data mart.
Figure 11A:
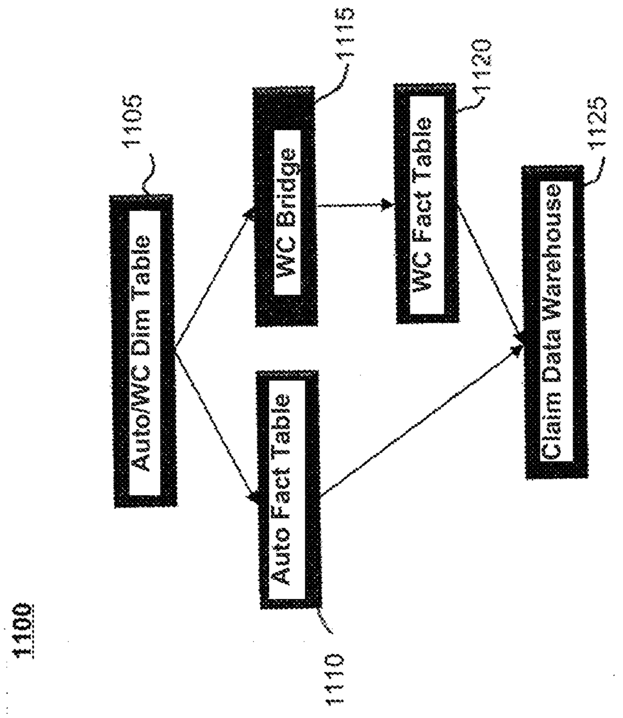

FIGS. 11A and 11B collectively illustrate an improvement in the data structure of the analytical data mart 810. FIG. 11A illustrates the current state 1100 of accessing data in the current data structure. The auto/medical/billing dim data including medical billing for treatment of injuries sustained in auto accidents and in workplace may be in a table 1105. This auto/medical/billing dim table 1105 may be separated into an Automobile, medical and billing fact table 1110 and a Workers compensation bridge 1115. The Workers compensation bridge 1115 may be reduced into the Workers compensation fact table 1120. The Workers compensation fact table 1120 and Automobile, medical and billing fact table 1110 may be combined into the claim data warehouse 1125.

FIG. 11B illustrates the state 1150 of the data according to the present invention. As illustrated in FIG. 11B, ADM 810 is directly connected with the claims data warehouse 1150. As a result of the data structure of the present invention, the data tables are connected directly to the data warehouse 1150 without intermediary tables that need to be accessed for data.

FIGS. 12A and 12B collectively illustrate the improvement in code provided by the data structure of the analytical data mart 810. Specifically, the code 1200 for accessing the current data structure is shown in FIG. 12A. This code 1200 includes approximately 33 lines of code with six different joins.

As shown n FIG. 12B, there is the improved code 1250 for accessing the data of the present invention. Code 1250 includes approximately 13 lines of code and only two joins required. The difference between code 1200 and code 1250 presents a significant reduction in development time. Queries using code 1250 run up to 4× faster while using the present ADM 810.

Figure 13:
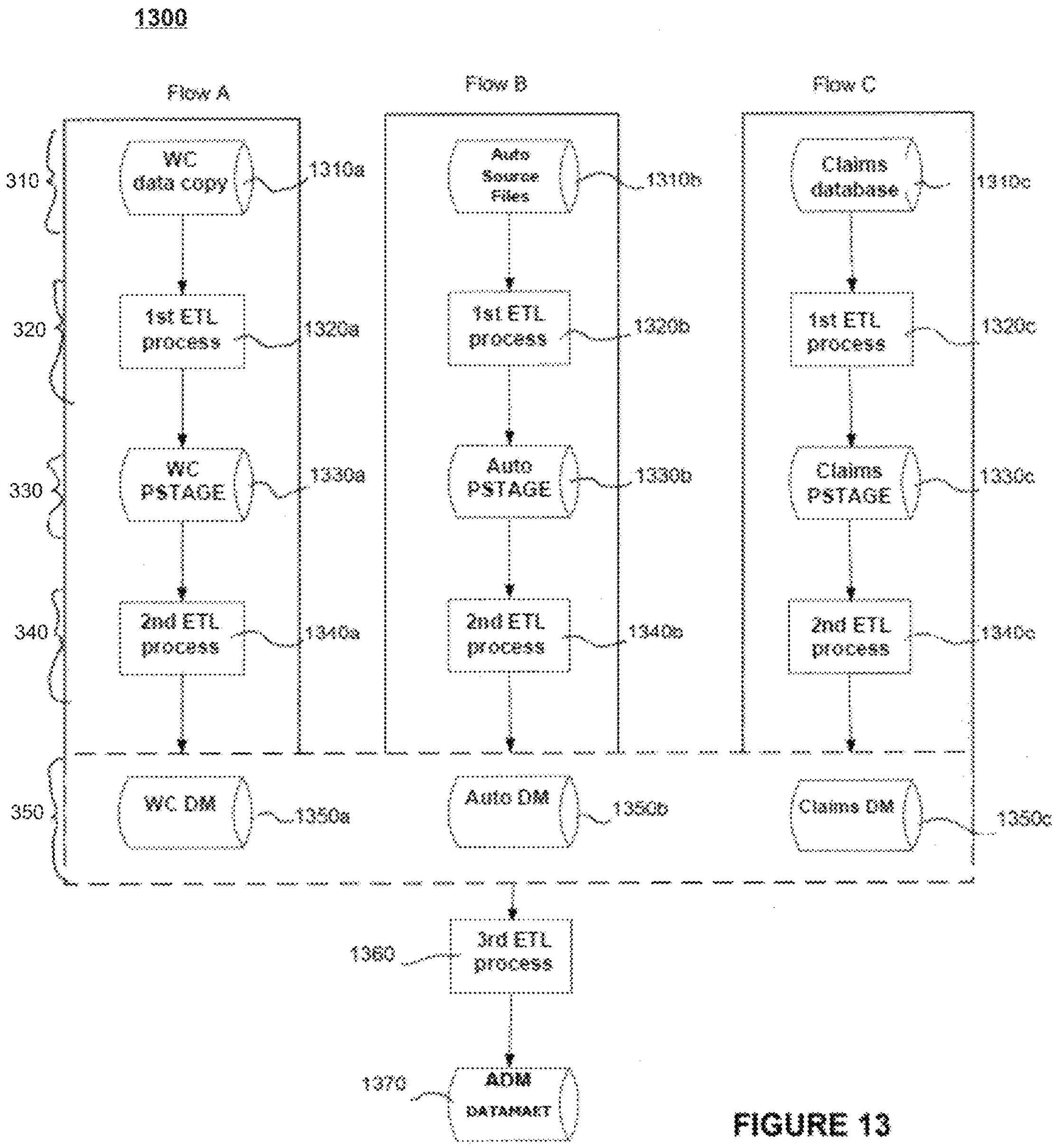
FIG. 13 illustrates a flow of reducing the complexity of the data in the analytical data mart sourced from multiple systems.

FIG. 13 illustrates a flow 1300 of reducing the complexity of the data in the analytical data mart 810 sourced from multiple systems. Flow 1300 includes starting with a copy of the data to be reduced into the data in the analytical data mart 810 at step 1310. This data is then processed at step 1320 using a first extract transform and load process effectively performing an extraction of the data. The data may be in its native format and populate into a datamart staging database at step 1330. This data may then be processed at step 1340 using a second extract transform and load process effectively a secondary extraction being performed. This second extract transform and load process collects the respective fact and dimension data that will be described herein below datamart may then be populated with the extracted data at step 1350 to provide source data. This source data is the data described hereinabove with respect to FIG. 9. This source data may then be processed, along with any other source data, at step 1360 in a third extract transform and load process to populate the analytical data mart at step 1370.

Flow 1300 may include data from multiple datamarts. For example, flow 1300 may include three sets of data reduced as Flow a, Flow b and Flow c. In Flow a, workers' compensation data may be included in the copy of the data to be reduced into the data in the analytical data mart 810 at step 1310*a*. This data is then processed at step 1320*a* using an extract transform and load process effectively performing an extraction of the data. The data may be in its native format and populate into a datamart staging workers' compensation database at step 1330*a*. This data may then be processed at step 1340*a* using an extract transform and load process effectively a secondary extraction being performed. A workers' compensation datamart may then be populated with the extracted data at step 1350*a* to provide source data.

In Flow b, auto medical billing data may be included in the copy of the data to be reduced into the data in the analytical data mart 810 at step 1310*b*. This data is then processed at step 1320*b* using an extract transform and load process effectively performing an extraction of the data. The data may be in its native format and populate into a datamart staging auto medical billing database at step 1330*b*. This data may then be processed at step 1340*b* using an extract transform and load process effectively a secondary extraction being performed. An auto medical billing datamart may then be populated with the extracted data at step 1350*b* to provide source data.

In Flow c, internal claims data may be included in the copy of the data to be reduced into the data in the analytical data mart 810 at step 1310*c*. This data is then processed at step 1320*c* using an extract transform and load process effectively performing an extraction of the data. The data may be in its native format and populate into a datamart staging internal claims, like an Enterprise Claims Operating System database at step 1330*c*. This data may then be processed at step 1340*c* using an extract transform and load process effectively a secondary extraction being performed. An internal claims datamart may then be populated with the extracted data at step 1350*c* to provide source data.

This source data extracted at steps 1350*a,b,c* may then be processed, along with any other source data, at step 1360 in an extract transform and load process to populate the analytical data mart at step 1370.

Figure 14:
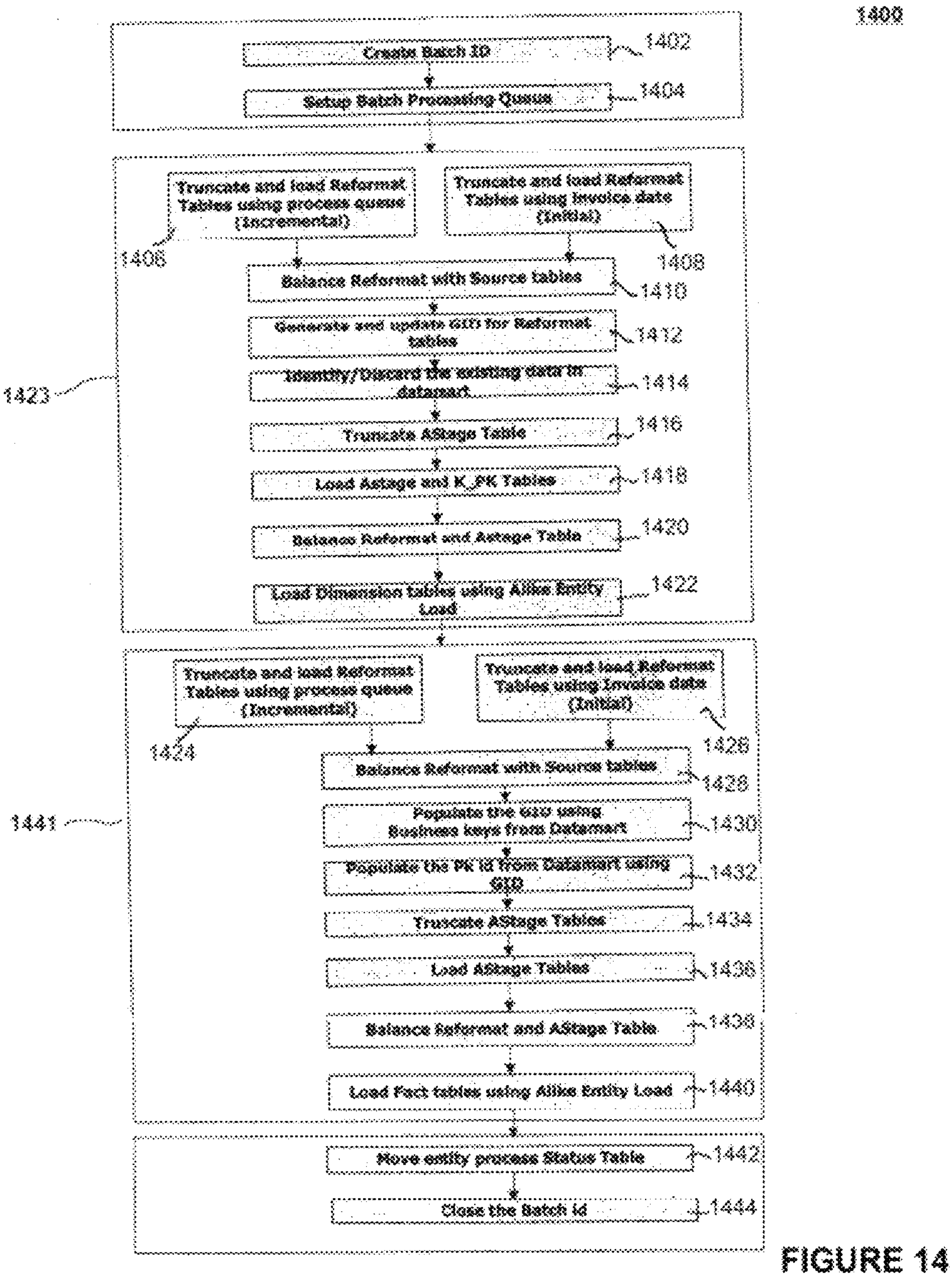
FIG. 14 illustrates a detailed method for the flow of FIG. 13 including the dimensional and fact loads.

FIG. 14 illustrates a detailed method 1400 for the flow of FIG. 13 including the dimensional and fact loads. Method 1400 relates to the dimension process flow shown in FIG. 15 and the fact process flow shown in FIG. 16. Method 1400 includes creating a batch identification at step 1402. The batch processing queue may be setup at step 1404.

Method 1400 includes a series of steps 1406-1422 that handle the dimension process flow 1423. At step 1406 the reformat tables may be truncated and loaded using a process queue. At step 1408, using the invoice data, the reformat tables may be truncated and loaded. At step 1410, a balance reformat may occur with source tables. A GID may be generated and updated for the reformat tables at step 1412. The data in the datamart may be identified and discarded at step 1414. The A stage table may be truncated at step 1416. At step 1418 the A stage and K Pk tables may be loaded. A balance may occur for the reformat and A Stage tables at step 1420. The dimension tables may be loaded using alike entity load at step 1422.

Method 1400 includes a series of steps 1424-1440 that handle the dimension process flow 1441. The reformat tables may be truncated and loaded using the process queue at step 1424. At step 1426, using the invoice data the reformat tables may be truncated and loaded. At step 1428, a balance reformat may occur with source tables. A global identifier (GID) may be generated using business keys at step 1430. The Pk id may be populated from the datamart using the GID at step 1432. The A stage table may be truncated at step 1434. At step 1436 the A stage table may be loaded. A balance may occur for the reformat and A Stage tables at step 1438. The fact table may be loaded using alike entity load at step 1440. The entity status table may be moved at step 1442 and the batch ID closed at step 1444 to complete flow 1400.

Figure 15:
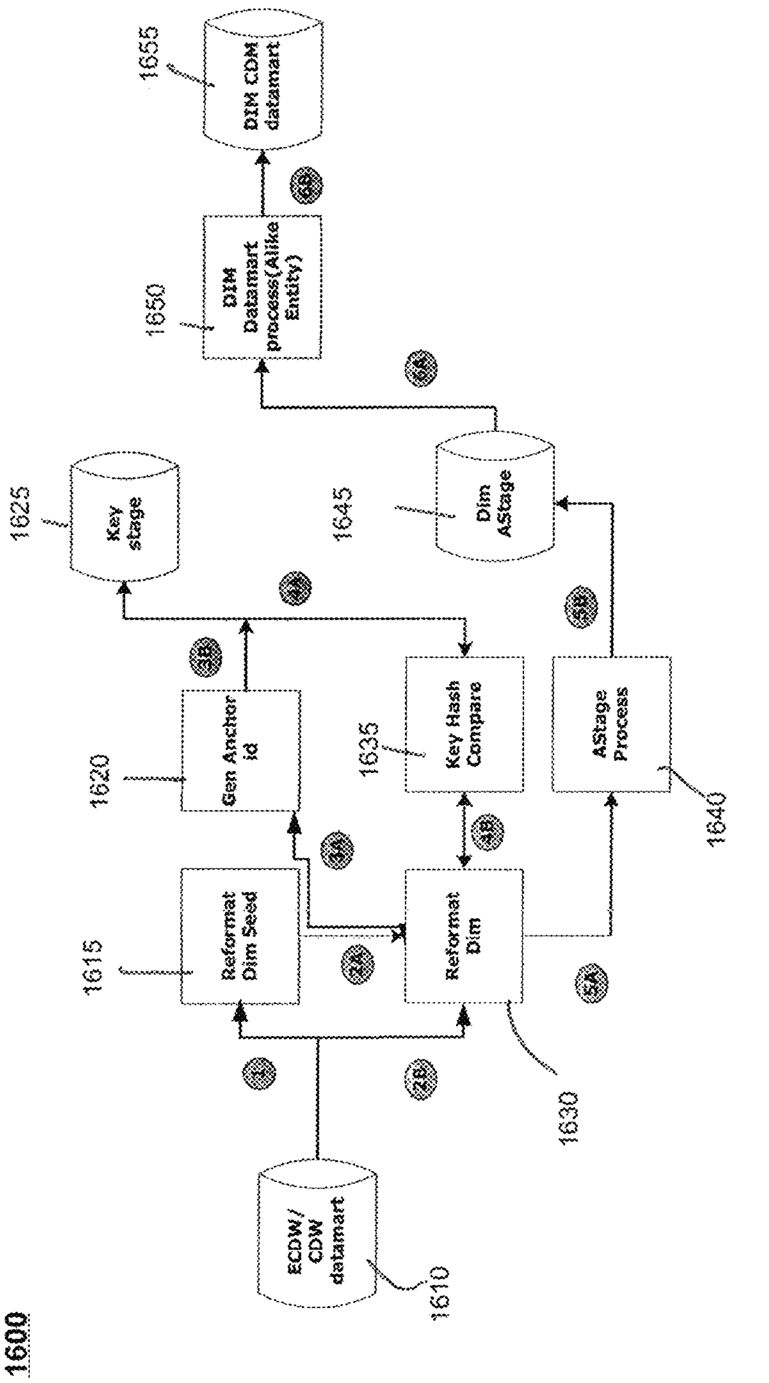
FIG. 15 illustrates a dimension process flow that provides more detail to the flow of FIG. 13.
Figure 16:
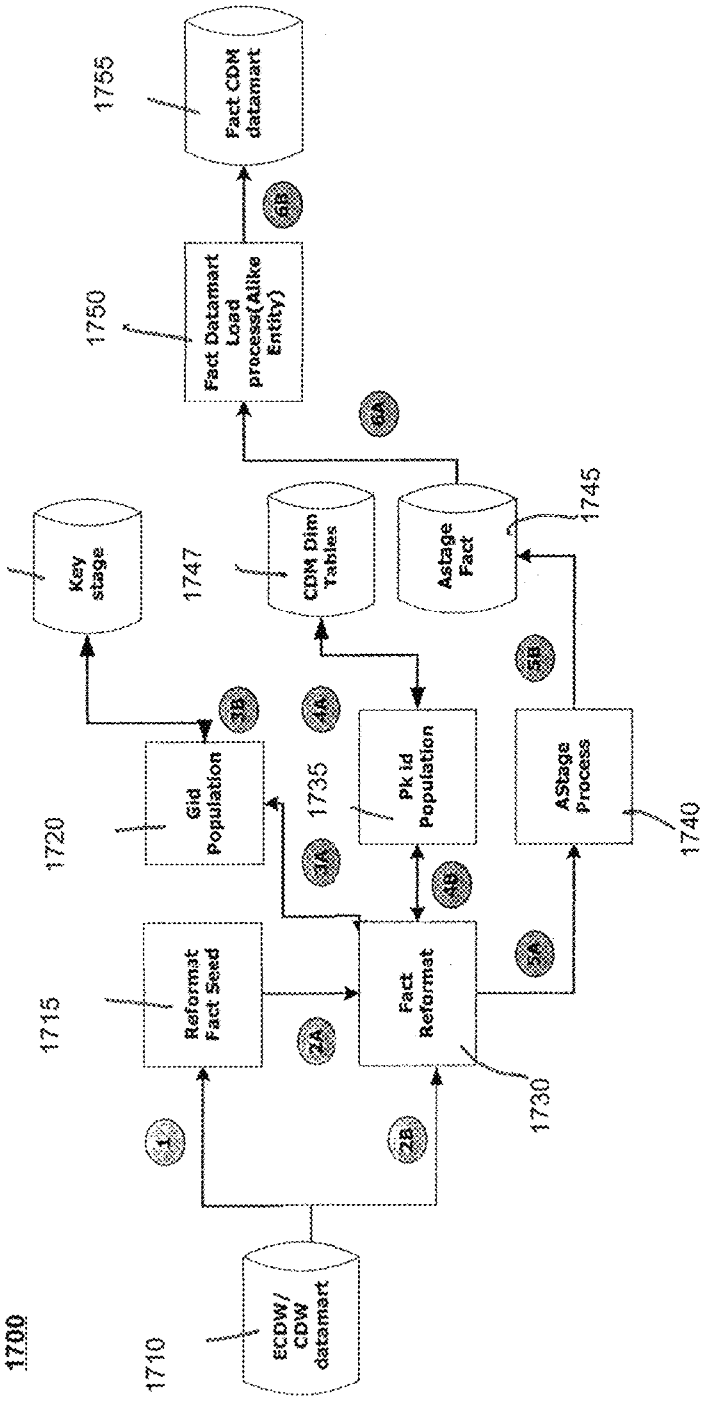
FIG. 16 illustrates a fact process flow that provides more detail to the flow of FIG. 13.

FIG. 15 illustrates a dimension process flow 1600 that provides more detail to the flow of FIG. 13. Flow 1600 illustrates extract transform and load processes involved in loading dimensional (DIM) data from datamart tables (starting with step 1310 of FIG. 13) to the ADM datamart (step 1370 of FIG. 13). FIG. 16 illustrates a fact process flow 1700 that provides more detail to the flow of FIG. 13. Flow 1700 illustrates the extract transform and load processes involved in loading typical fact data from datamart tables (starting with step 1310 of FIG. 13) to the ADM datamart (step 1370 of FIG. 13).

"DIM" refers to a dimension table, and "FACT" refers to a fact table. The Claims Data Warehouse 905, including the ADM 810, is designed according the principles of dimensional data warehouse modelling, which stipulate that the data basically be organized into fact tables and dimension tables. Fact tables contain metrics, such as measureable data points including invoice amount, payment amount, for example, and keys to join these fact tables to specific dimension tables. Dimension tables contain attributes, such as descriptors, of the facts. By way of example, payment amount is a fact; payment type is an attribute. Each dimension table generally contains multiple attribute columns related to a single subject, plus one key column which is used to join this table to one or more fact tables. For example, a claim payment fact table may contains records for various claim payments, each with a payment amount (fact), plus keys to join to various dimension tables. There might be, for example, a claimant dimension table which contains columns describing the claimants related to the payments, such as first name, last name, for example. There may also be a policy dimension table, which contains columns describing the policy associated with the claim payments, such as policy number, policy effective date, for example. The payment fact table contains a key column to join to the claimant dimension table, and a separate key column to join to the policy dimension table. Using these tables payments may be analyzed by both claimant and policy characteristics, as well as by the myriad combinations of claimant and policy characteristics.

Flow 1600 begins with datamart data 1610. Flow 1600 identifies the incremental business key and source effective dates at step 1 by reformatting the dimension seed 1615. In populating the data from source tables at step 2B using an incremental key and effective dates data into dimensional reformat table at step 2A and balance with the seed table for a reformatted DIM at 1630. The global identifier (GID) 1620 is verified using the business key data in the reformat table at step 3A with the key table and keep same GID with the same reformat table at step 3B. The data between the reformat and key table 1625 may be compared using the hash number 1635 at step 4A. If the comparison is positive, the batch ID may be updated in the reformat table to a designated value, such as −2, for example, at step 4B. If the comparison is negative, the update includes a number in the key table 1625. The data may be loaded at step 5A from the reformat table 1630 to an A stage table 1640 excluding the records with the designated value and loads the data into A stage and K Pk tables 1645 at step 5B. The datamart tables 1650 may be loaded using the extract transform and load processes available as per the target table load types, for example alike entity load, alike entity merge, and the like at step 6A, and populates the ADM datamart 1655 at step 6B.

FIG. 16 illustrates a fact process flow 1700 that provides more detail to the flow of FIG. 13. Flow 1700 illustrates the extract transform and load processes involved in loading typical fact data from datamart tables (starting with step 1310 of FIG. 13) to the ADM datamart (step 1370 of FIG. 13). Flow 1700 begins with datamart data 1710. Flow 1700 identifies the incremental business key and source effective dates at step 1 for fact loading by reformatting the fact seed 1715. In populating the data from source tables at step 2B using an incremental key and effective dates data into fact reformat table at step 2A and balances the seed table for a reformatted fact at 1730. The global identifier (GID) 1720 is verified using the business key data in the fact reformat table 1730 at step 3A with the key table and keeps the same GID with the same reformat table at step 3B. The data between the reformat and key table 1725 may be compared using the GID between fact reformat table 1730 and the dimensional datamart 1747 at step 4A. If the comparison is positive, the Pk id 1735 may be updated in the reformat table to a designated value, such as −1, for example, at step 4B. The data may be loaded at step 5A from the fact reformat table 1730 to an A stage table 1740 excluding the records with the designated value and loads the data into A stage and fact A stage tables 1745 at step 5B. The datamart tables 1750 may be loaded using the extract transform and loads processes available as per the target table load types, for example alike entity load, alike entity merge, and the like, at step 6A and populates the ADM datamart 1755 at step 6B.

The flows 1600 and 1700 may be performed periodically such as at the end of a day and once per scheduled day. A historical load, when flows 1600 and 1700 capture all data from a certain historical period, may be performed initially and then from time to time as needed to verify that all data is captured. Incremental loads, when flows 1600 and 1700 capture only the data that is new since the last load, may occur periodically and be designed to only capture the data since the last incremental load.

Figure 17:
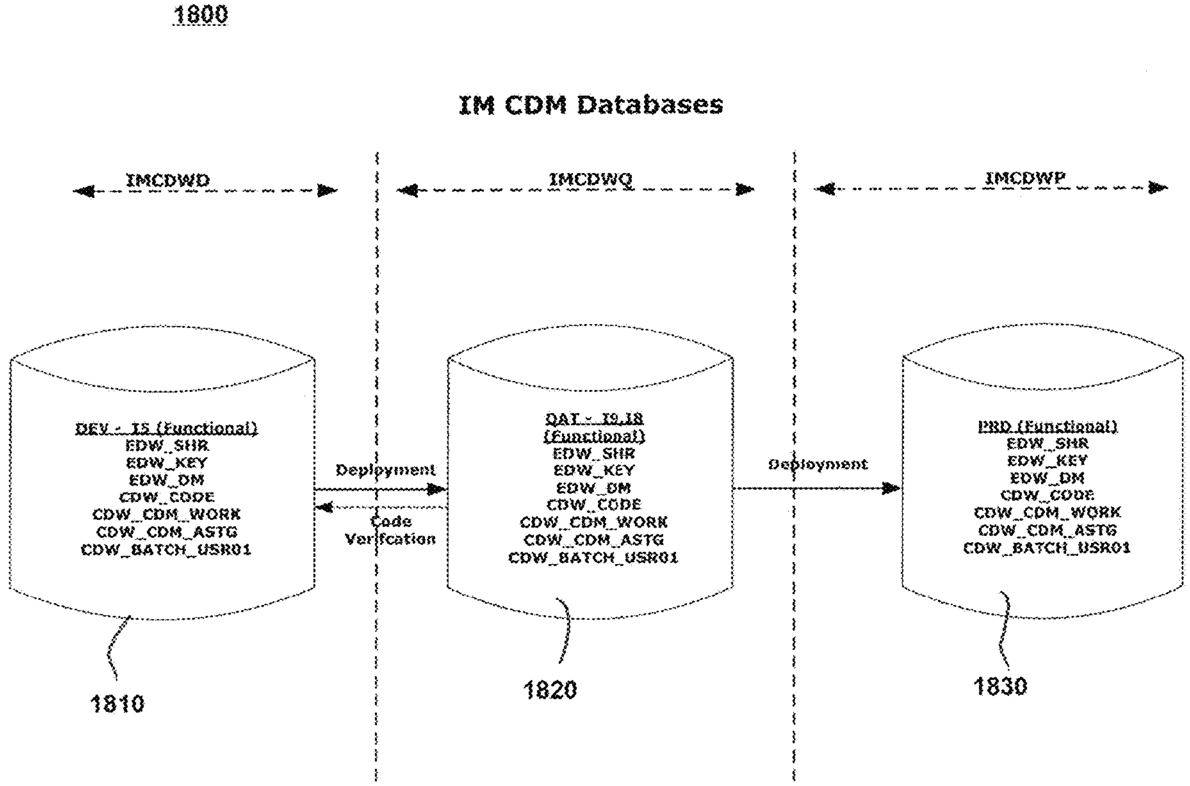
FIG. 17 illustrates a view of application related schemas for setup and migration processes.

FIG. 17 illustrates a view 1800 of application related schemas for setup and migration processes. View 1800 depicts a developmental database 1810 that enables code verification and deployment for a functional database 1820. Functional database 1820 provides deployment for another function database 1830.

DEV is short for development database 1810. DEV is the database environment in which developers initially create data objects (tables, stored procedures which extract/transform/load data, etc.). This is a working environment in which data is unstable, as it is under development. Only developers are generally granted access to this environment.

QAT is short for Quality Assurance Testing found in the functional database 1820. Once the developers have created and verified the database objects in the DEV environment 1810, the objects are copied into the QAT environment 1820 (represented by the "deployment" arrow between DEV and QAT). Quality Assurance testers and User Acceptance Testers (UAT) perform structured tests on the database objects in this environment to validate that the business requirements have been met and that the data is performing as expected. Any issues found in the testing process are fixed in the development environment, then redeployed in the QAT environment 1820 to be retested. The test environment is more stable than the development environment, because the database objects are static except when a fix is being deployed. Access is granted to developers and testers only.

PRD is short for Production database 1830. This is the final, customer-facing database environment used by end users for the intended business purposes. Once the database objects have been completely validated in the QAT environment 1820, they are deployed in the production environment 1830 (represented by the "deployment" arrow between QAT and PRD). Access is granted to developers, testers and end users. This is the most stable of the three environments, as database objects cannot be altered by anyone except in formal production releases or emergency fixes.

The following tables represent depictions of tables which is fundamental to the core design of the ADM 810. These tables show the consolidation of Party ("Actor") data, and the subsequent linkage of this party data to events, specifically claims and invoices. "All" of the parties are initially gathered in the "all party" table (Table 1), which will function as a staging table, or hopper for the consolidated party table. This "All Party" table serves as a staging table where currently medical provider data from multiple sources is gathered. This physician (this combination of first name, last name, tax ID and national ID) has submitted ten invoices, two from automobile, medical and billing source and eight from the workers compensation source.

TABLE 1

"ALL PARTY" TABLE
All Party Dimension Table

| ALL_PRTY_PK_ID | SRCE_EFF_START_TMSP | SRCE_SYS_CD | SRCE_ENTITY_ID | PRTY_CATGY_CD | CNSLDT_PRTY_GID |
|---|---|---|---|---|---|
| 131912000000619 | Mar/25/2016 03:35:00 AM | AMB | 303228950 | IND | 3112050 |
| 132446000002178 | Apr/13/2016 03:34:49 AM | AMB | 306747123 | IND | 3112050 |
| 131660001716113 | Feb/17/2014 09:46:39 AM | WC | 169174584 | IND | 3112050 |
| 131660003629596 | Dec/19/2014 01:2049 PM | WC | 219082182 | IND | 3112050 |
| 131662001081162 | Feb/13/2015 11:30:14 AM | WC | 227653874 | IND | 3112050 |
| 131660001717070 | Feb/15/2016 05:13:38 PM | WC | 296149865 | IND | 3112050 |
| 131660002198482 | Feb/03/2015 12:31:30 AM | WC | 224846724 | IND | 3112050 |
| 131660003321022 | Mar/02/2016 05:31:24 PM | WC | 299729158 | IND | 3112050 |
| 131660002848609 | Dec/18/2014 11:50:51 AM | WC | 218908478 | IND | 3112050 |
| 131660003505223 | Apr/22/2015 09:54:35 AM | WC | 238729796 | IND | 3112050 |

TABLE 1-continued

"ALL PARTY" TABLE
All Party Dimension Table

| ALL_PRTY_PK_ID | SRCE_ENTITY_TYP_CD | SRCE_ENTITY_TYP_DESC | PRTY_FIRST_NM |
|---|---|---|---|
| 131912000000619 | INVC_PROVIDER_GID | INVC_PROVIDER_GID FROM EDW_DM.INVC_PROVIDER_DIM | Jane |
| 132446000002178 | INVC_PROVIDER_GID | INVC_PROVIDER_GID FROM EDW_DM.INVC_PROVIDER_DIM | Jane |
| 131660001716113 | INVC_PROVIDER_GID | INVC_PROVIDER_GID FROM EDW_DM.INVC_PROVIDER_DIM | Jane |
| 131660003629596 | INVC_PROVIDER_GID | INVC_PROVIDER_GID FROM EDW_DM.INVC_PROVIDER_DIM | Jane |
| 131662001081162 | INVC_PROVIDER_GID | INVC_PROVIDER_GID FROM EDW_DM.INVC_PROVIDER_DIM | Jane |
| 131660001717070 | INVC_PROVIDER_GID | INVC_PROVIDER_GID FROM EDW_DM.INVC_PROVIDER_DIM | Jane |
| 131660002198482 | INVC_PROVIDER_GID | INVC_PROVIDER_GID FROM EDW_DM.INVC_PROVIDER_DIM | Jane |
| 131660003321022 | INVC_PROVIDER_GID | INVC_PROVIDER_GID FROM EDW_DM.INVC_PROVIDER_DIM | Jane |
| 131660002848609 | INVC_PROVIDER_GID | INVC_PROVIDER_GID FROM EDW_DM.INVC_PROVIDER_DIM | Jane |
| 131660003505223 | INVC_PROVIDER_GID | INVC_PROVIDER_GID FROM EDW_DM.INVC_PROVIDER_DIM | Jane |

| ALL_PRTY_PK_ID | PRTY_LAST_NM | TIN | NATL_ID_NUM |
|---|---|---|---|
| 131912000000619 | Doe | 105643321 | 1366558897 |
| 132446000002178 | Doe | 105643321 | 1366558897 |
| 131660001716113 | Doe | 105643321 | 1366558897 |
| 131660003629596 | Doe | 105643321 | 1366558897 |
| 131662001081162 | Doe | 105643321 | 1366558897 |
| 131660001717070 | Doe | 105643321 | 1366558897 |
| 131660002198482 | Doe | 105643321 | 1366558897 |
| 131660003321022 | Doe | 105643321 | 1366558897 |
| 131660002848609 | Doe | 105643321 | 1366558897 |
| 131660003505223 | Doe | 105643321 | 1366558897 |

where ALL_PRTY_PK_ID uniquely identifies a record in this table, SRCE_EFF_START_TMSP is the effective Start Date/Time of this record, SRCE_SYS_CD identifies the source of the record (AMB=automobile, medical and billing vendor data, WC=workers compensation vendor data), SRCE_ENTTY_ID unique key in source table, PRTY_CATGY_CD defines party as either an individual or an organization, CNSLDT_PRTY_GID is a unique identifier of this combination of name, tax ID and national ID, SRCE_ENTTY_TYP_CD describes the source entity ID, enabling one to join back to the source table, SRCE_ENTTY_TYP_DESC describes the source entity table and column, enabling one to join back to the source table, PRTY_FIRST_NM is the party first name, PRTY_LAST_NM is party last name, TIN is tax ID number, and NATL_ID_NUM is national ID number.

This "all party" data may be consolidated in the "consolidated party" table (Table 2), such that identical name/tax ID/national ID combinations in the "all party" table (Table 1) are consolidated to a single record in the consolidated party table. Table 2 consolidates all of the unique combination of name, tax ID and national ID. The 10 invoice-party records which share identical name/tax ID/national ID in the "all party" table (Table 1) have been consolidated to a single record in Table 2.

TABLE 2

"CONSOLIDATED PARTY" TABLE
Consolidated Party Dimension Table

| CNSLDT_PRTY_PK_ID | SRCE_EFF_START_TMSP | CNSLDT_PRTY_GID | TIN | PRTY_FIRST_NM |
|---|---|---|---|---|
| 131660000272755 | Feb/17/2014 09:46:39 AM | 3112050 | 105643321 | Jane |

| CNSLDT_PRTY_PK_ID | PRTY_LAST_NM | MSTR_PRTY_ID NATL_ID_NUM | PRT_CATGY_CD | PRTY_FULL_NM |
|---|---|---|---|---|
| 131660000272755 | Doe | 1366558897 | IND | Doe, Jane |

where CNSLDT_PRTY_PK_ID uniquely identifies a record in this table, SRCE_EFF_START_TMSP is the effective start date/time of this record, CNSLDT_PRTY_GID is unique identifier of this combination of name, tax ID and national ID, TIN is tax ID number, PRTY_FIRST_NM is party first name, PRTY_LAST_NM is party last name, MSTR_PRTY_ID is a currently empty column designed to house an ID which results from a future entity resolution process which will, for example, resolve that Jane Doe of 1 XYZ Street is the same physician as J Doe of 1 xyz Street (within a statistically defined tolerance), NATL_ID_NUM is a national identification number, PRTY_CATGY_CD is the party category denoting individual or organization and PRTY_FULL_NM is party full name.

Tables 1 and 2 reflect the data as it is processed in flow 1600 of FIG. 15.

The bi-directional relationship between consolidated parties and claims, loss events, etc. is defined in the event-party involvement table (Table 3). Table 3 defines the many-to-many relationship between the consolidated parties and the loss events (claims). In this case, the one physician in the consolidated party table maps to five unique claim/role combinations (three specialties and four claims). The various "... GID" columns ("Global ID" columns) allow Table 3 to be joined directly to the tables which are defined at those GID levels of granularity. In other words, Table 3 may be directly joined to a loss event table, a claim table, an incident (exposure) table and the consolidated party table.

TABLE 3

"EVENT-PARTY INVOLVEMENT" TABLE
Event-Party Involvement Fact Table

| LOSS_EVNT_GID | CLM_GID | INCID_GID | CNSLDT_PRTY_GID | PRTY SRCE_SYS_CD | PRTY_CATGY_CD |
|---|---|---|---|---|---|
| −2 | 67827340 | −2 | 3112050 | WC | IND |
| −2 | 69615862 | −2 | 3112050 | WC | IND |
| 13033889 | 71404825 | 5532851 | 3112050 | WC | IND |
| −2 | 69615862 | −2 | 3112050 | WC | IND |
| 13744474 | 71469416 | 5674916 | 3112050 | AMB | IND |

| LOSS_EVNT_GID | CNSLDT_ROLE_GID | ROLE_CATGY_DESC | SPECL_GRP_DESC | SPECL_DESC |
|---|---|---|---|---|
| −2 | 25035 | MEDICAL SERVICES | OSTEOPATHY | DOCTOR OF OSTEOPATHY |
| −2 | 25035 | MEDICAL SERVICES | OSTEOPATHY | DOCTOR OF OSTEOPATHY |
| 13033889 | 25164 | MEDICAL SERVICES | ORTHOPEDIC SURGERY | ORTHOPEDIC SURGERY |
| −2 | 25164 | MEDICAL SERVICES | ORTHOPEDIC SURGERY | ORTHOPEDIC SURGERY |
| 13744474 | 25034 | MEDICAL SERVICES | OSTEOPATHY | OSTEOPATHY |

where LOSS_EVNT_GID uniquely identifies a loss event in the claims data warehouse. This key allows the CDM data to be joined to the existing claims data warehouse claim data. CLM_GID uniquely identifies a claim in the claims data warehouse. This key allows the CDM data to be joined to the existent claims data warehouse claim data. INCID_GID uniquely identifies a loss incident (conceptually comparable to a coverage) in the claims data warehouse. This key allows the CDM data to be joined to the existing claims data warehouse claim data. CNSLDT_PRTY_GID is a unique identifier of this combination of name, tax ID and national ID, PRTY_SRCE_SYS_CD identifies the source of the record (AMB=automobile, medical and billing vendor data, WC=workers compensation vendor data). PRTY_CATGY_CD defines party as either an individual or an organization, CNSLDT_ROLE_GID uniquely identifies a party role (in this case, a physician's specialty), ROLE_CATGY_DESC is a high-level categorization of the party role (e.g., Medical Services, Legal Services, etc.), SPECL_GRP_DESC is a categorization of specialty based on statistical analysis, and SPECL_DESC is a text description of specialty; in this case, physician specialty.

The bi-directional relationship between consolidated parties and invoices is defined in the invoice-party involvement table (Table 4). Table 4 defines the many-to-many relationship between the consolidated parties and the invoices. In this case, the one physician in the consolidated party table maps to ten unique invoices from two disparate sources (automobile, medical and billing and workers compensation). The various "... GID" columns ("Global ID" columns) allow this table to be joined directly to the tables which are defined at those GID levels of granularity. In other words, this table can be directly joined to a loss event table, a claim table, an incident (exposure) table, the consolidated party table, the consolidated role table and the invoice table.

TABLE 4

"INVOICE-PARTY INVOLVEMENT" TABLE
Invoice-Party Involvement Fact Table

| INVC_GID | CLM_GID | INCID_GID | LOSS_EVNT_GID | INDIV_CNSLDT_PRTY_GID | CNSLDT_ROLE_GID |
|---|---|---|---|---|---|
| 79808340 | 67827340 | −2 | −2 | 3112050 | 25035 |
| 90037940 | 69615862 | −2 | −2 | 3112050 | 25035 |
| 92617205 | 69615862 | −2 | −2 | 3112050 | 25164 |
| 90554660 | 69615862 | −2 | −2 | 3112050 | 25164 |
| 114129736 | 71404825 | 5532851 | 130338899 | 3112050 | 25164 |
| 88971059 | 69615862 | −2 | −2 | 3112050 | 25164 |

TABLE 4-continued

"INVOICE-PARTY INVOLVEMENT" TABLE
Invoice-Party Involvement Fact Table

| | | | | | |
|---|---|---|---|---|---|
| 88928546 | 69615862 | −2 | −2 | 3112050 | 25164 |
| 113422502 | 71404825 | 5532851 | 13033889 | 3112050 | 25164 |
| 114856165 | 71469416 | 5674916 | 13744474 | 3112050 | 25034 |
| 11557322 | 71469416 | 5674916 | 13744474 | 3112050 | 25034 |

| INVC_GID | INVC_AMT | INVC_PD_AMT | INVC_PPO_REDUC_AMT | INVC_SAVE_AMT | INVC_PD_DT |
|---|---|---|---|---|---|
| 79808340 | 538 | 251 | 0 | 287 | 20,140,219 |
| 90037940 | 83 | 64 | 0 | 19 | 20,150,206 |
| 92617205 | 83 | 0 | 0 | 83 | 20,150,423 |
| 90554660 | 83 | 0 | 0 | 83 | 20,150,216 |
| 114129736 | 229 | 0 | 0 | 229 | 20,160,302 |
| 88971059 | 249 | 0 | 0 | 249 | 20,141,222 |
| 88928546 | 249 | 0 | 0 | 249 | 20,141,219 |
| 113422502 | 229 | 0 | 0 | 229 | 20,160,215 |
| 114856165 | 3,354 | 1,639 | 795 | −1,715 | −1 |
| 11557322 | 198 | 89 | 28 | −109 | −1 |

| INVC_GID | INVC_SUMB_DT | INVC_SRVC_FROM_DT | INVC_SRVC_THRU_DT | SRCE_SYS_CD |
|---|---|---|---|---|
| 79808340 | 20,140,204 | 20,140,203 | 20,140,203 | WC |
| 90037940 | 20,150,122 | 20,150,121 | 20,150,121 | WC |
| 92617205 | 20,150,414 | 20,150,408 | 20,150,408 | WC |
| 90554660 | 20,150,205 | 20,150,121 | 20,150,121 | WC |
| 114129736 | 20,160,225 | 20,160,120 | 20,160,120 | WC |
| 88971059 | 20,141,212 | 20,141,210 | 20,141,210 | WC |
| 88928546 | 20,141,211 | 20,141,210 | 20,141,210 | WC |
| 113422502 | 20,160,212 | 20,160,120 | 20,160,120 | WC |
| 114856165 | 20,160,216 | 20,160,127 | 20,160,212 | AMB |
| 11557322 | 20,160,301 | 20,160,226 | 20,160,226 | AMB |

| INVC_GID | ROLE_CATGY_DESC | SPECL_GRP_DESC | SPECL_DESC |
|---|---|---|---|
| 79808340 | MEDICAL SERVICES | OSTEOPATHY | DOCTOR OF OSTEOPATHY |
| 90037940 | MEDICAL SERVICES | OSTEOPATHY | DOCTOR OF OSTEOPATHY |
| 92617205 | MEDICAL SERVICES | ORTHOPEDIC SURGERY | ORTHOPEDIC SURGERY |
| 90554660 | MEDICAL SERVICES | ORTHOPEDIC SURGERY | ORTHOPEDIC SURGERY |
| 114129736 | MEDICAL SERVICES | ORTHOPEDIC SURGERY | ORTHOPEDIC SURGERY |
| 88971059 | MEDICAL SERVICES | ORTHOPEDIC SURGERY | ORTHOPEDIC SURGERY |
| 88928546 | MEDICAL SERVICES | ORTHOPEDIC SURGERY | ORTHOPEDIC SURGERY |
| 113422502 | MEDICAL SERVICES | ORTHOPEDIC SURGERY | ORTHOPEDIC SURGERY |
| 114856165 | MEDICAL SERVICES | OSTEOPATHY | OSTEOPATHY |
| 11557322 | MEDICAL SERVICES | OSTEOPATHY | OSTEOPATHY |

where INVC_GID uniquely identifies an invoice in the claims data warehouse, CLM_GID uniquely identifies a claim in the claims data warehouse, INCID_GID uniquely identifies an incident (roughly comparable to a coverage) in the claims data warehouse, LOSS_EVNT_GID uniquely identifies a loss event in the claims data warehouse, INDIV_CNSLDT_PRTY_GID uniquely identifies a party in the consolidate party table. This column identifies individuals only, not organizations, although both exist in the consolidated party table. CNSLDT_ROLE_GID uniquely identifies a consolidated role, in this case, a physician specialty, INVC_AMT is an invoice submitted amount, INVC_PD_AMT is an invoice paid amount, INVC_PPO_REDUC_AMT is an invoice reduction amount due to PPO, INVC_SAVE_AMT is an invoice savings amount, INVC_PD_DT is an invoice paid date (format YYYYMMDD), INVC_SUBM_DT is an invoice submitted date (format YYYYMMDD), INVC_SRVC_FROM_DT is an invoice "service from" date (format YYYYMMDD), INVC_SRVC_THRU_DT is an invoice "service through" date (format YYYYMMDD), SRCE_SYS_CD identifies the source of the record (AMB=automobile, medical and billing vendor data, WC=workers compensation vendor data), ROLE_CATGY_DESC is a high-level Categorization of the party role (e.g., medical services, legal services, etc.), SPECL_GRP_DESC is a categorization of specialty based on statistical analysis, and SPECL_DESC provides a text description of specialty; in this case, physician specialty.

These involvement tables (Tables 3 and 4) contain multiple keys, or "global identifiers" (" . . . GID" columns) which enable the CDM data to be directly joined to multiple claims data warehouse tables at various levels of detail (or "grains"). Tables 3 and 4 reflect the data as it is processed in flow 1700 of FIG. 16.

Figure 18:
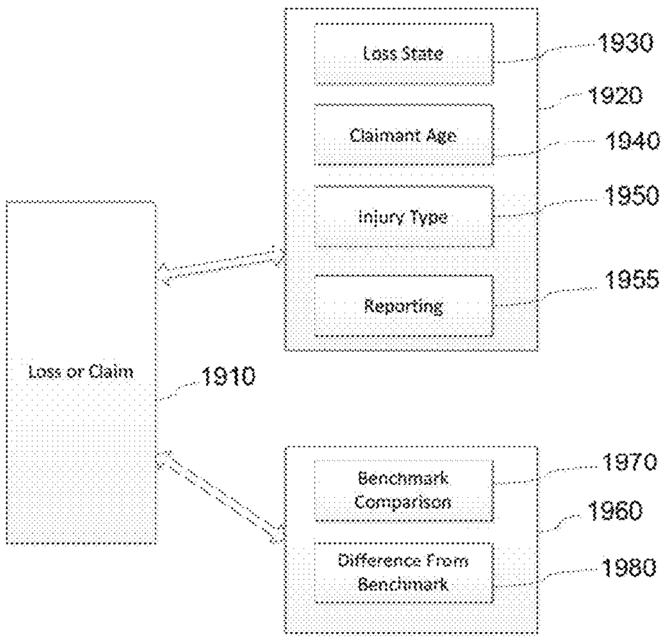
FIG. 18 illustrates elements of a predictive model.

Outlier analysis is generally performed on unweighted data with no variable to model to. This analysis may include identifying and/or calculating a set of classifying characteristics. Referring now to FIG. 18, in the case of a loss or claim 1910 the classifying characteristics 1920 may include loss state 1930, claimant age 1940, injury type 1950, and reporting 1955.

Additionally, these classifying characteristics 1920 may be calculated by comparing a discrete observation 1960 against a benchmark 1970 and use the differences 1980 as the characteristic. For example, the number of line items on a bill compared to the average for bills of the type may be determined. A ratio may be used so that if the average number of line items is 4 and a specific bill has 8, the characteristic may be the ratio, in the example a value of 2.

An algorithm may be used to group the target, such as claims for example, into sets with shared characteristics. Each group or cluster of data may be profiled and those that represent sets of observations that are atypical are labeled as outliers or anomalies. A record is made for each observation with all of the classifying characteristics, and values used to link the record back to the source data. The label for the cluster that the observation belonged to, whether it is normal or an outlier with a data of classification is recorded.

Outlier engine 830 may be used, for example, to utilize characteristics such as binary questions, claim duration, and peer group metrics to measure the relative distance from a peer group. This enables outlier engine 830 to identify claims that have high ratio and K means clustering.

For example, when performing invoice analytics on doctor invoices to check for conformance including determining if doctors are performing the appropriate testing, a ratio of duration of therapy to average duration therapy may be utilized. A score of 1 may be assigned to those ratios that are the same as the average, a score of 2 may be assigned to those ratios that are twice as long and 0.5 assigned to the ratios that are half as long. Outlier engine 830 may then group data by the score data point to determine if a score of 2 finds similarity with other twice as long durations, which classification enables the data to provide other information that may accompany this therapy including, by way of example, a back injury.

The ratio of billed charges may also be compared to the average. A similar scoring system may be utilized where a score of 1 is assigned to those ratios that are the same as the average, a score of 2 may be assigned to those ratios that are twice as high and 0.5 assigned to the ratios that are half as much. Similarly, the ratio of the number of bills/claim to average may also be compared and scored. The measure of whether a procedure matches a diagnosis may also be compared and scored. The billed charges score may be used based on the diagnosis to determine if a given biller is consistently providing ratios that are twice as high as others.

According to one aspect, things that do not correlate may be dropped as unique situations. That is duplicative variables that correlate in their outcomes may be dropped. Outlier engine 830 may also utilize a predictive model. As is generally understood in the art, a predictive model is a model that utilizes statistics to predict outcomes. Alternatively, in an implementation, predictive modeling may not be based on statistics, instead including association rules, sequence mining, and linear/non-linear optimization. Outlier engine 830 may use a predictive model that may be embedded in workflow, for example. Such a model may include biases of end users and priorities and/or may include a leap of faith. Such a model may benefit from reuse because the model may be honed based on previous uses. The output of outlier engine 830 may be provided to the analytics of the supply chain.

Figure 19:
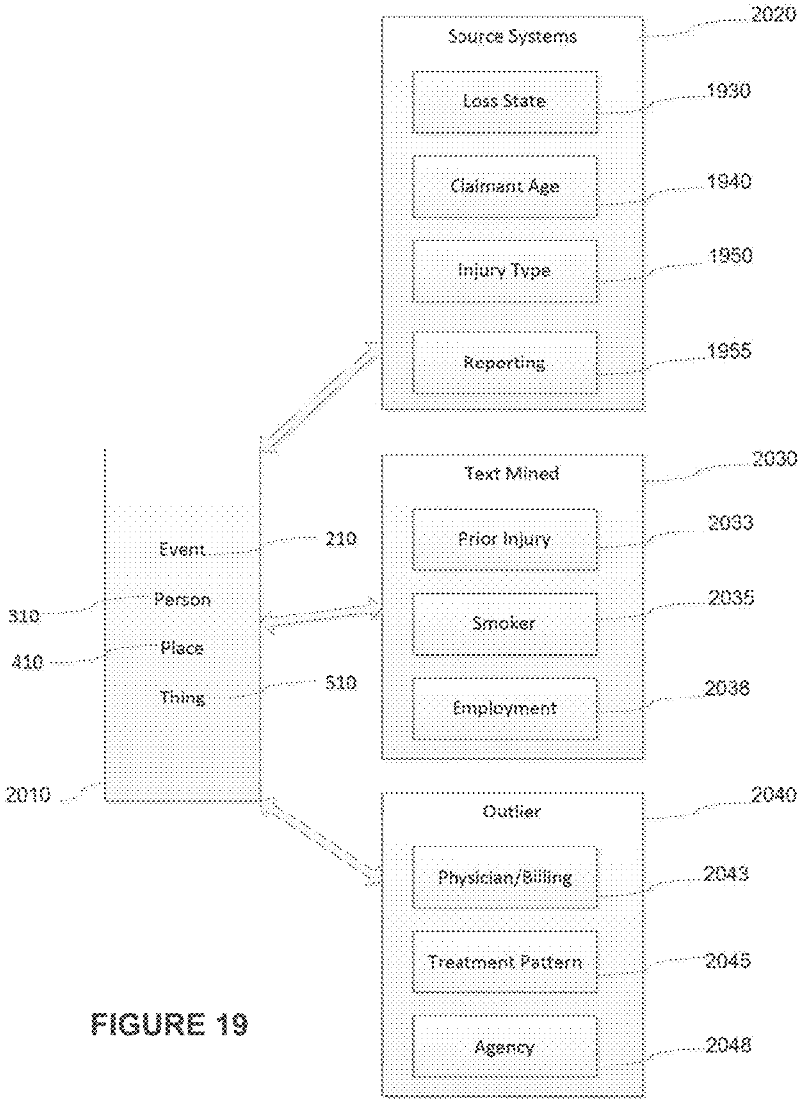
FIG. 19 illustrates predictor variables, source systems, and text mined characteristics.

Referring now also to FIG. 19, there is illustrated an example data system for the outlier engine 830. The outlier engine 830 becomes, along with the data available from source systems and characteristics derived through text mining, a source of information describing a characteristic 2010 including an event 210, person 310, place 410 and/or thing 510 that is the subject of a predictive model. Predictor variables may include source systems 2020, text mine 2030, and outlier 2040. Using claim as an example, source systems 2020 may include loss state 1930, claimant age 1940, injury type 1950 and reporting 1955 including the channel the claim was reported through such as phone, web, or attorney call, for example.

Data may be considered standard data from text mine 2030. Using claim as an example, prior injury 2033, smoking history 2035, and employment status 2038 may be included.

Outlier 2040 characteristics may also be included. Outlier characteristics 2040 may include physician/billing information 2043, such as if the physician is a 60-70% anomaly biller, treatment pattern 2045, such as if the treatment pattern is an anomaly, and the agency 2048, such as if the agency is an outlier for high loss ratio insureds.

Figure 20:
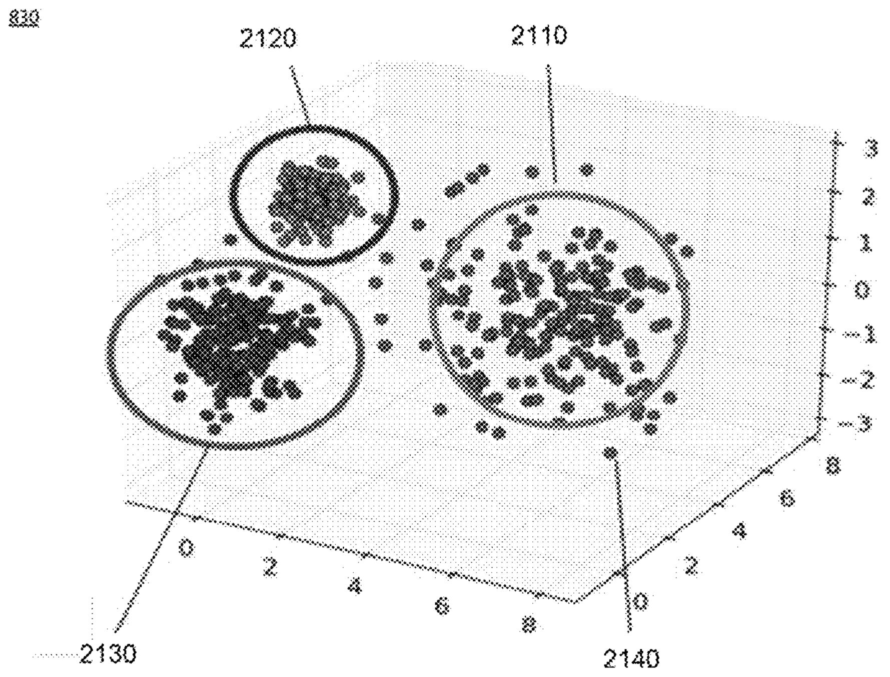
FIG. 20 illustrates the outlier engine with normative area, areas of interest and an outlier.

Referring now also to FIG. 20, outlier engine 830 is illustrated with a normative area 2110 wherein all target characteristics are typical, a first area of interest 2120 wherein there is an unusual procedure for the provider specialty and an unusual pattern of treatment for the injury, a second area of interest 2130 wherein there is an unusual number of invoices and the presence of co-morbidity/psycho-social condition, and outlier 2140 that is too far from any clump and includes a unique profile.

For example, an invoice belonging to a set may be analyzed and presented with characteristics of that invoice including doctor and treatment for example as well as the injury suffered. The axes shown in FIG. 20 may be defined by attributes of the group of invoices. Data may be grouped based on sharing attributes or qualities, like duration of treatment for an injury for example. Other data may fall in between groups as described. The groupings of data become an important attribute of the data fitting that group.

Figure 21:
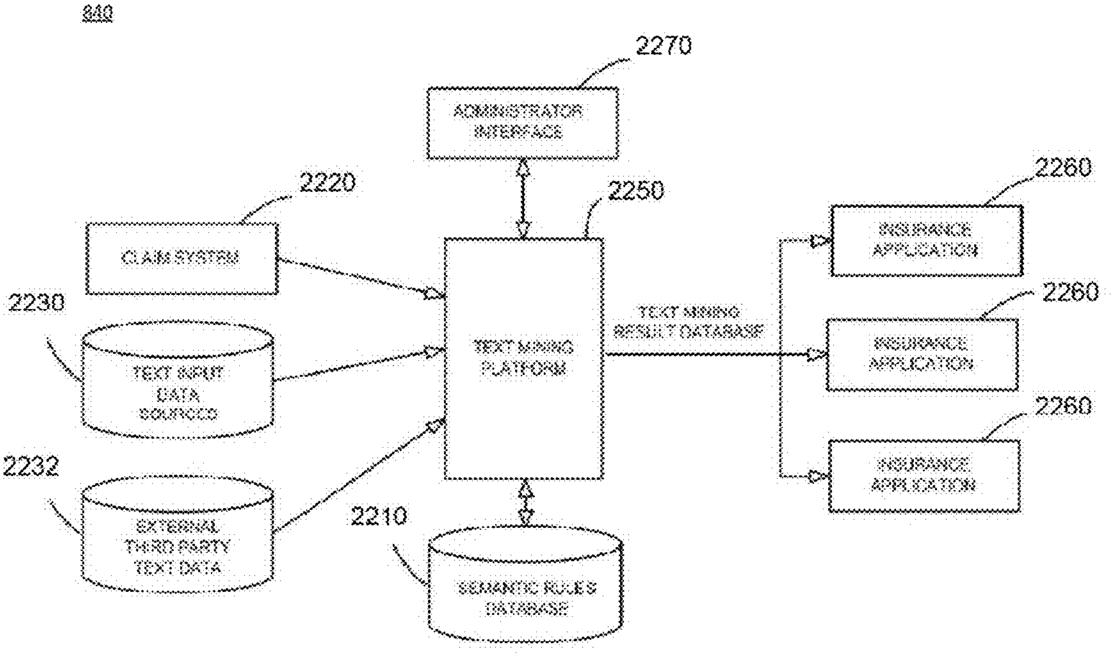
FIG. 21 illustrates a block diagram of the text factory.

Referring now also to FIG. 21, a block diagram of text factory 840 is shown. Text factory 840 includes a text mining platform 2250 that receives information from a semantic rules database 2210, a claim system 2220, one or more text input data sources 2230 (e.g., internal to an insurance enterprise), and/or external third party text data 2232 (e.g., reports issued by the National Highway Safety Board). The text mining platform 2250 might be, for example, associated with a personal computer (PC), laptop computer, an enterprise server, a server farm, and/or a database or similar storage devices. The text mining platform 2250 may, according to some embodiments, be associated with a business organization or an insurance provider.

According to some embodiments, an "automated" text mining platform 2250 may access semantic rules in the semantic rules database 2210 to mine the information from the claim system 2220 and/or the other text input data sources 2230. As used herein, the term "automated" may refer to, for example, actions that can be performed with little or no human intervention.

The text mining platform 2250 may store information into and/or retrieve information from the semantic rules database 2210 and/or a text mining result database that is output to various external insurance applications 2260 (e.g., software applications or devices associated with subrogation, fraud detection, and/or recovery factor analysis). The semantic rules database 2210 may be a locally stored relational database or reside remote from the text mining platform 2250. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical administrator interface 2270 may provide the ability to access and/or modify the semantic rules database 2210 via the text mining platform 2250. The administrator interface 2270 might, for example, let an administrator define terms, dictionaries, mapping rules, etc.

associated with text mining. The data sources 2230, 2232 may be thought of as "publishers" of information to be consumed by the text mining platform 2250, and the insurance applications 2260 may be considered "subscribers" to information created by the text mining platform 2250. Moreover, note that the text mining platform 2250 may operate asynchronously and/or independently of any insurance application 2260.

Although a single text mining platform 2250 is shown in FIG. 21, any number of such devices may be included. Moreover, various devices described herein might be combined according to embodiments of the present invention. For example, in some embodiments, the text mining platform 2250 and semantic rules database 2210 might be co-located and/or may comprise a single apparatus.

Figure 22:
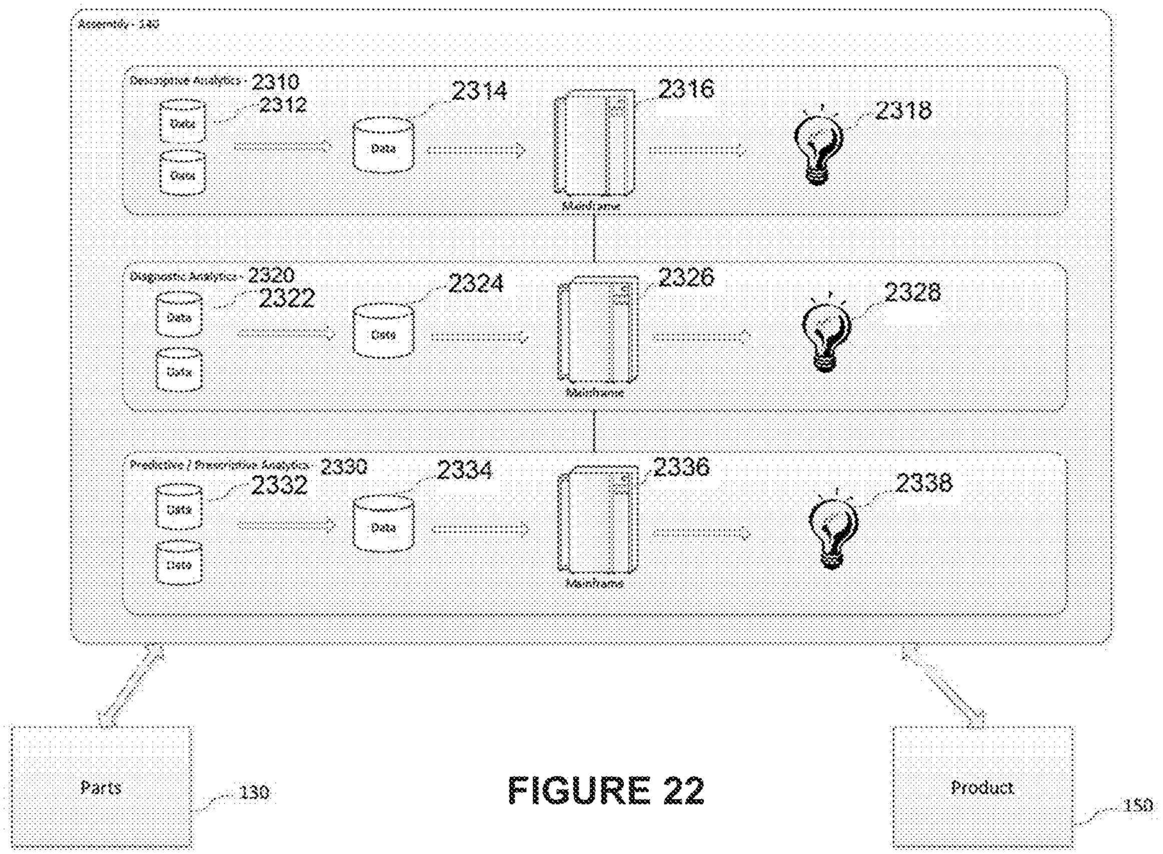
FIG. 22 illustrates the assembly of the data.

FIG. 22 illustrates the assembly 140 of the data. This includes the many levels of analytics used in business including business intelligence and data mining, optimization and simulation, and forecasting. Descriptive analytics 2310 may be used. Descriptive analytics 2310 is the business intelligence and data mining aspect of analytics and includes the management and reporting of the analytics. Generally, descriptive analytics 2310 may view data and analyze past events for insight about approaching the future. Descriptive analytics 2310 may analyze past performance by mining historical data to look at the reasons for past success and failures, such as post-mortem analysis. Descriptive models may be used to quantify relationships in data to groups by grouping portions of the data including the many different relationships that may exist within the data.

Descriptive analytics 2310 may include standard management reports and information referred to as management information systems (MIS). This reports what is and what has happened. The descriptive analytics 2310 may be metric heavy having many measures of performance of the business with a limited set of attributes used to filter and display the metrics. Common examples include daily performance dashboards, financial results reports, inventory and aging reports, scorecards of relative performance among a set of employees, partners with a shared perspective.

Specifically, FIG. 22 may include data 2312 in repositories that may be accumulated into one or a singularly accessible storage 2314 to be processed according to the descriptive analytics method on a processor or other mainframe 2316. The resulting analytics 2318 result from this processing.

Similarly, FIG. 22 may include data 2322 in repositories that may be accumulated into one or a singularly accessible storage 2324 to be processed according to the diagnostic analytics method on a processor or other mainframe 2326. The resulting analytics 2328 result from this processing.

FIG. 22 may include data 2332 in repositories that may be accumulated into one or a singularly accessible storage 2334 to be processed according to the predictive/prescriptive analytics method on a processor or other mainframe 2336. The resulting analytics 2338 result from this processing.

Figure 23:
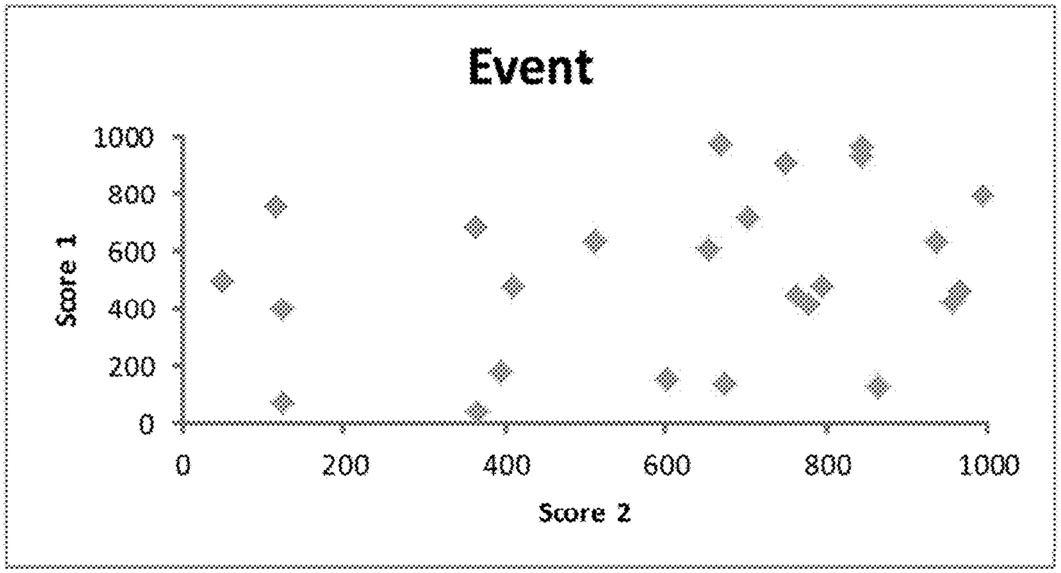
FIG. 23 illustrates a dashboard representing the relationship of scores for events.

The present system may use dashboards to represent performance by showing revenue for a given year, debt-to-equity and return on equity as well as net profit margin and gross profit margin comparisons, represent financial results report showing revenue, earnings and dividends, profitability balance sheet, cash flow, industry, and other facts, represent inventory and aging report showing invoices and balances due, and represent a scorecard of relative performance page showing signups, conversions and % visitors, by way of non-limiting examples only. Additionally, outputs and scorecards may represent other facets of the present system. For example, FIG. 23 illustrates a scorecard for events, such as events 210, for example, being plotted based on a first score, score 1, against a second score, score 2. Score 1 is illustrated as ranging from 0 to 1000. Similarly, score 2 ranges from 0 to 1000. Groupings of the events may be understood or realized using such a dashboard. Similar dashboards and scorecards may be presented for person 310, place 410, and thing 510, by way of example.

Figure 24:
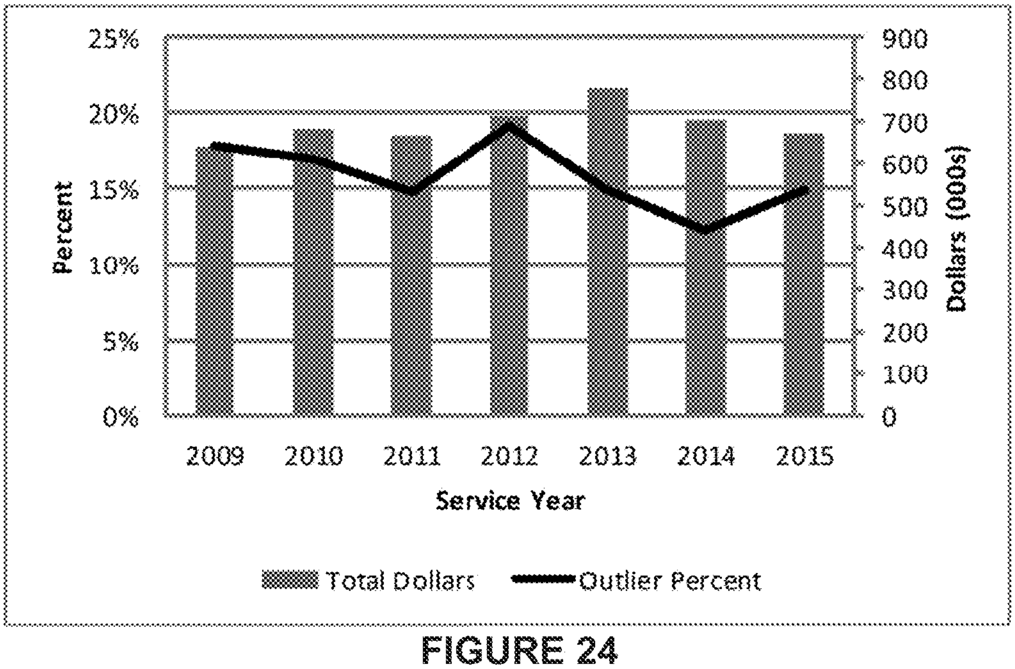
FIG. 24 illustrates a dashboard representing total dollars and outlier percentage based on year.

FIG. 24 illustrates a dashboard representing total dollars plotted against service year and includes as an overlay outlier percent by year. This dashboard may enable a relationship to be determined between outlier percent and total dollars. As would be understood, other variables may be presented in such a dashboard to enable relationship there between to be realized. One such relationship shown in FIG. 24 includes outlier percentage decreasing as total dollars increases in year 2014.

Figure 25:
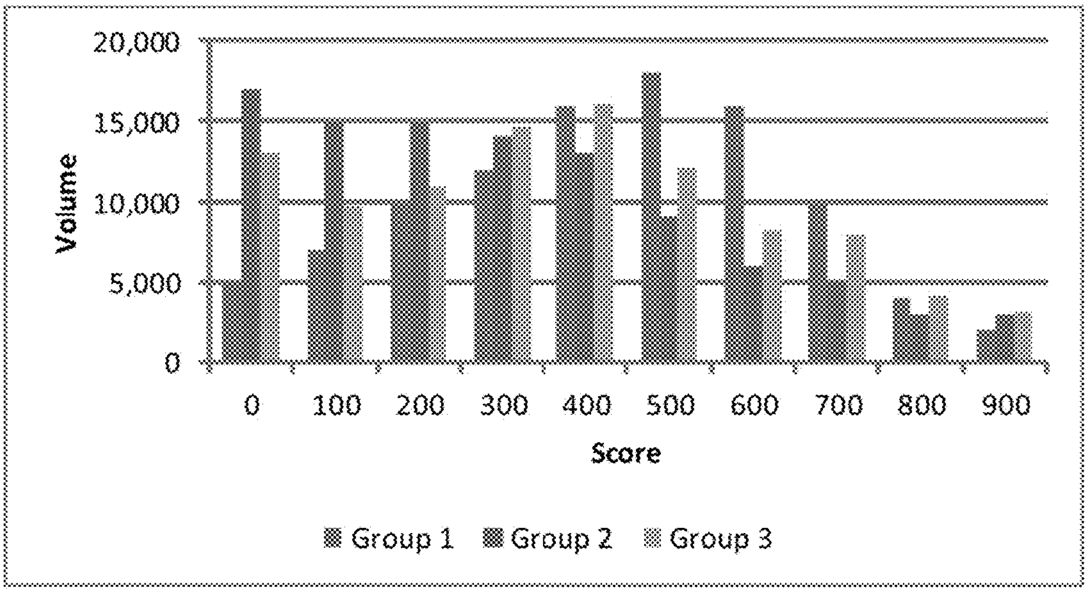
FIG. 25 illustrates a dashboard of volume of a characteristic plotted against score for selected groups.

FIG. 25 illustrates a dashboard representing volume of a characteristic 2010 plotted against score for three respective groups. In this illustration, group 1 demonstrates a bell curve of volume centered approximately centered on a score of 400. Group 2 demonstrates increased volume at lower scores. Group 3 demonstrates a fluctuating volume related to score.

Figure 26:
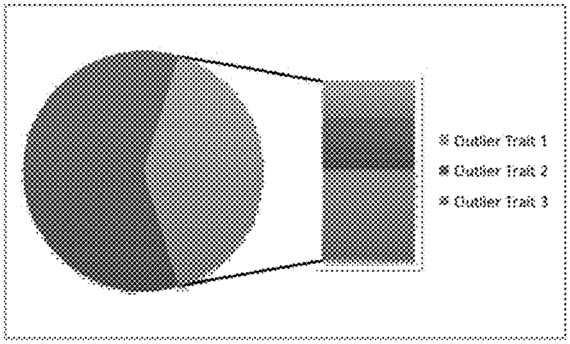
FIG. 26 illustrates a dashboard of a pie chart of outlier traits within characteristics.

FIG. 26 illustrates a dashboard of a pie chart of outlier traits. In this illustration, the pie chart is distributed between two portions represented as blue and orange. The orange portion includes three outlier traits, trait 1, trait 2, and trait 3, with trait 3 being most represented followed by trait 2 at approximately 50% of trait 3, and trait 1 at approximately 50% of trait 2.

Assembly 140 may also include diagnostic analytics 2320. Diagnostic analytics 2320 includes the "why" and "what if" aspects of the data analytics.

Assembly 140 may also include predictive and/or prescriptive analytics 2330. Predictive and/or prescriptive analytics 2330 may include the type of information that may be included to make or prevent an event. Predictive and/or prescriptive analytics 2330 may include analytics involving forecasting. Predictive and/or prescriptive analytics 2330 includes the optimization and simulation portion of the analytics.

Predictive analytics 2330 includes the processes that turn data into actionable information. Predictive analytics 2330 may use data to determine the probable future outcome of an event of the likelihood of certain things occurring. Predictive analytics 2330 may include any number of statistical techniques including modeling, machine learning, data mining, game theory where there is current and historical facts that are analyzed to make predictions about future events. This may include using models to synthesize patterns in the data to identify risks and opportunities.

Prescriptive analytics 2330 may include the synthetization of data, rules, to make predictions and provide suggestions to take advantage of the predictions. Prescriptive analytics 2330 goes beyond predictive analytics 2330 by not only predicting future outcomes but also suggesting action to leverage the predictions and identifying the implications of each decision.

Diagnostic analytics 2320 starts during the descriptive analytics 2310 and extends into predictive analytics 2330. Diagnostic analytics 2320 gets into root cause analysis and data discovery and exploration. Diagnostic analytics 2320 aids in understanding why things happened to enable improvement in business operations and processes. Diagnostic analytics 2320 provides the ability to drill down into all types of data coming from many different sources.

Figure 27:
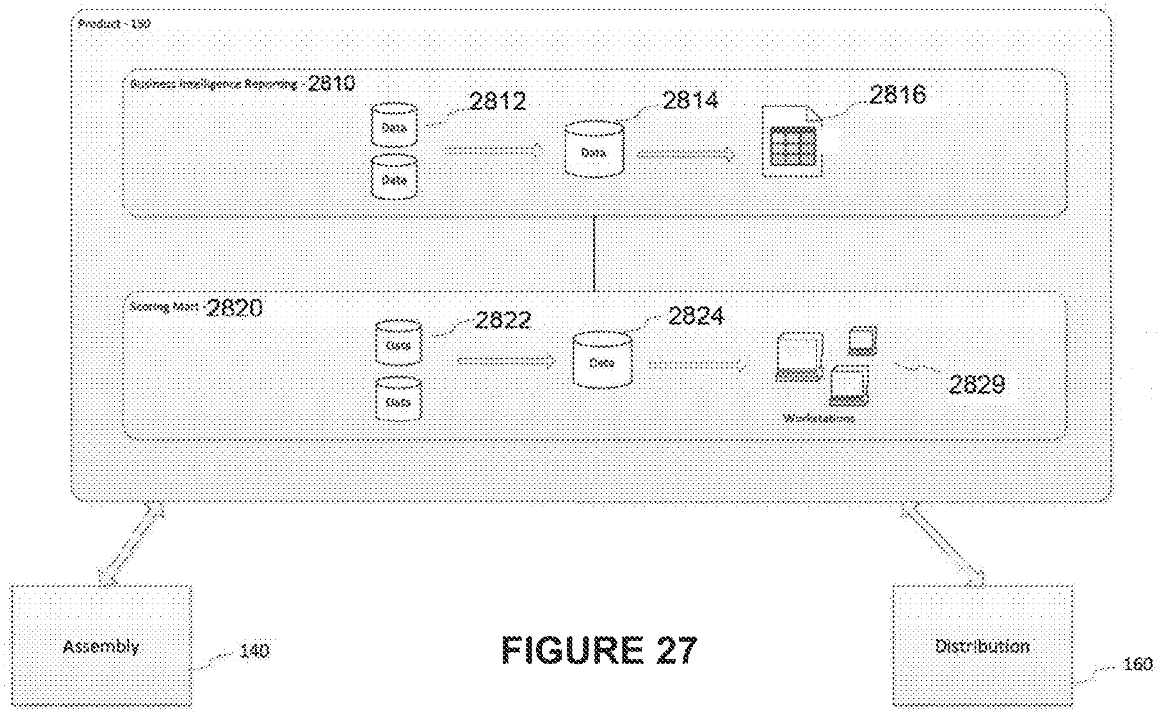
FIG. 27 illustrates the components of product.

FIG. 27 illustrates the components of product 150. Specifically, product 150 may include business intelligence (BI) reporting 2810 and scoring mart 2820.

BI reporting 2810 may include forms of human delivery reporting. BI reporting 2810 may include housing the data in data storage 2812 and accumulating the data in a singular storage 2814. The data may be provided in spreadsheets 2816 and/or other known reporting mechanisms. Spreadsheets 2816 may include other reporting that provides the business intelligence to humans, for example.

Scoring mart 2820 may contain the final output of a broad set of scoring processes used in assembly 140. This scoring mart 2820 may include the predictive/prescriptive analytics 2330 described hereinabove. Scoring mart 2820 may utilize a rules-based scoring system and may aggregate the scores summarizing from one entity to another. Scoring mart 2820 may include attributes or metadata associated with the score as will be discussed herein below.

Scoring mart 2820 may include data storage 2822 for housing data from assembly 140. The data may be accumulated within a data repository 2824 and scores may be output per queries from a database or by reporting 2829. Reporting 2829 may generally take the form of any transfer to other computers or systems.

Figure 28:
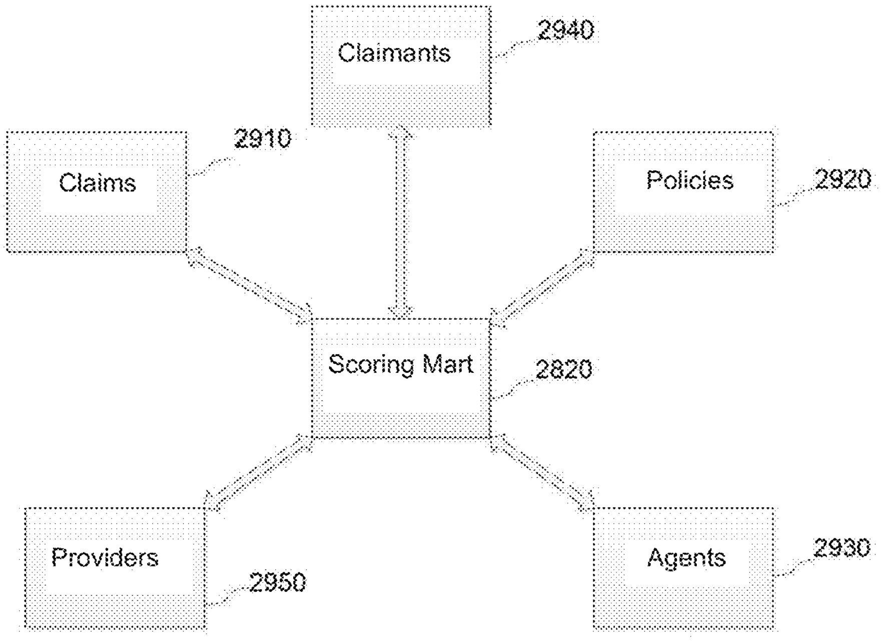
FIG. 28 illustrates exemplary items assigned a ranking in the scoring mart.

Referring now additionally to FIG. 28, which illustrates exemplary items that may be assigned a ranking in the scoring mart 2820. Items may include claims 2910, policies 2920, agents 2930, claimants 2940, and providers 2950. Scoring mart 2820 may be the repository to archive the rank of any item within the system. As an example, a fraud model may score claims 2910 based on the priority to engage a special investigator to investigate that claim for fraud, waste and abuse. Claims 2910 may be distributed based on priority, and that priority may then be converted into a score and stored in scoring mart 2820. Scoring mart 2820 may hold scores for any item that may be assigned a ranking within the present system.

Additionally, scoring mart 2820 may hold more than one score per item. For example, a fraud score may be stored for an item based on a 30 day score and another on a 3 year score, as the fraud score may be different. This may occur because the score for the first 30 days was lower because the likelihood or level of suspected fraud was low, and then the score for fraud increased as additional actions occurred over the next 3 years. The scoring mart 2820 may be used to rank doctors within the system each quarter, for example. Underwriting may wish to score agencies using 12 reasons.

Figure 29:
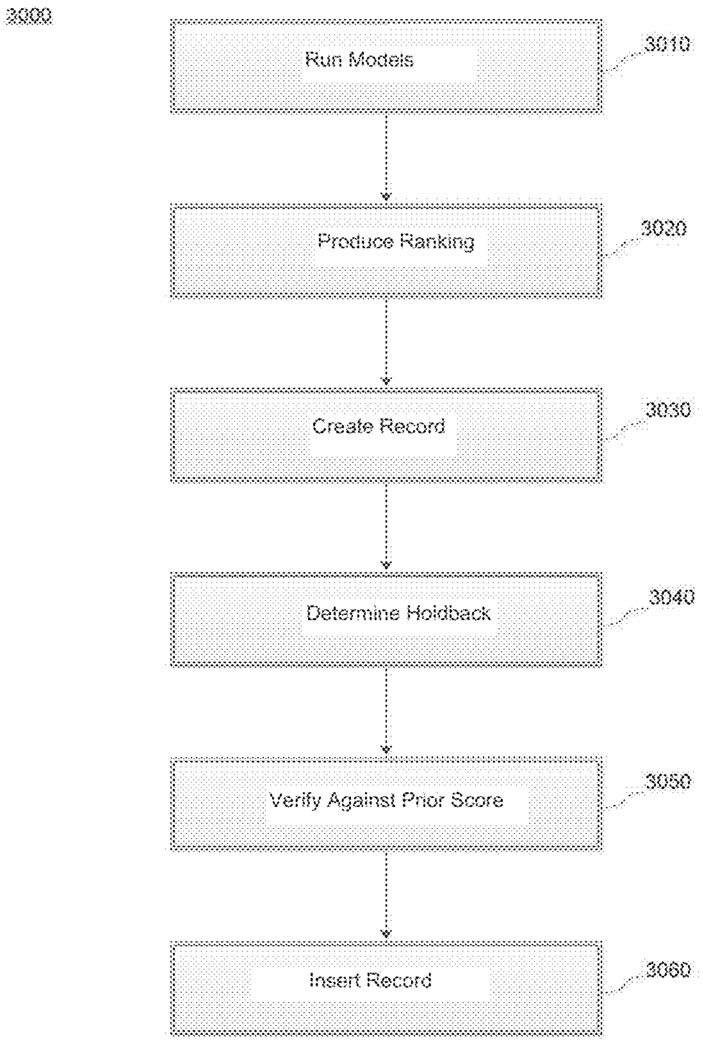
FIG. 29 illustrates a method performed in the scoring mart.

FIG. 29 illustrates a method 3000 performed in the scoring mart 2820. Method 3000 may include running models at step 3010. Once the models are run at step 3010, method 3000 may produce a ranking based on the purpose of that model at step 3020. Records are created in the scoring mart 2820 for each item scored with the date of the, the identity of what is scored, the identity of the specific scoring process, the raw score, a normalized score to simplify consumption rules, a value of whether this score is part of a holdback sample, a date range over which the score is considered to be valid at step 3030. At step 3040, method 3000 may determine what qualifies for holdback. The score may be verified against a prior score at step 3050 when the scoring mart 2820 searches its history to determine if there is a prior score for the scored item and scoring process. If the scoring mart 2820 determines there is a prior a score, that prior score may be expired as of the day prior to the new record. At step 3060, scoring mart 2820 may insert the new record with a valid date range, generally starting with the insert date and potentially have no end date.

Referring now to FIG. 30, there is illustrated a data set associated with scoring mart 2820. As shown in FIG. 30, the data may include a date of the score 3110, the model 3120, the line of business 3130, the entity type 3140, the entity identification 3150, the normalized score 3160, and the holdback 3170. The line of business 3130 may provide a tag related to the line of business being represented and the model being used. Entity type 3140 identifies the business entity associated with the score. Entity type 3140 may include the claim, policy, TIN, agency, or the like. Entity identification 3150 identifies the element that the score attaches to in the format determined by entity type 3140. Normalized score 3160 may be a score within the range 0-999. In addition, a holdback flag 3170 allowing scores to be reserved as control for measurement.

FIG. 31 illustrates an example batch lookup of scores within scoring mart 2820. As illustrated in FIG. 31, scores that meet a set of criteria may be looked up in batch. Further, those scores may be used for workflow triggers and reporting. For example, in FIG. 31, a search for all scores for line of business 3130 of worker's compensation (WC) and a model 3120 of large losses having a normalized score 3160 of a value greater than 500 not identified with a holdback 3170 may be performed. The result of a batch lookup given these parameters may be data points 3210. In this batch lookup, the other data points 3220, 3230, 3240, 3250, 3260, 3270 may not be included in the result of the batch lookup 3210, based on at least of model 3120, line of business 3130, normalized score 3160, and holdback 3170. Data points 3220, 3270 may not be included in the batch lookup result because of each of model 3220, line of business 3130, normalized score 3160 is not positively identified. Data point 3230 may not be included in the batch lookup result because the normalized score 3160 is not greater than the requested 500. Data point 3240 is not included at least because holdback 3170 is positive. Data points 3250, 3260 may not be included in the batch lookup result because normalized score 3160 is not positively identified as being greater than 500.

FIG. 32 illustrates an example batch lookup of scores within scoring mart 2820. As illustrated in FIG. 32, a search for all scores that meet a set of criteria may be looked up in real-time. Further, those scores may be used for workflow triggers and reporting. For example, in FIG. 32, a search for all scores for line of business 3130 of WC and a model 3120 of large loss having a normalized score 3160 of a value greater than 500 not identified with a holdback 3170 may be performed. The result of a real-time lookup given these parameters may be data points 3310. In this real-time lookup, the other data points 3320, 3330, 3340, 3350, 3360, 3370 may not be included in the result of the real-time lookup 3310, based on at least of model 3120, line of business 3130, normalized score 3160, and holdback 3170. Data points 3320, 3370 may not be included in the real-time lookup result because of each of model 3120, line of business 3130, normalized score 3160 is not positively identified. Data point 3330 may not be included in the real-time lookup result because the normalized score 3160 is not greater than the requested 500. Data point 3340 is not included at least because holdback 3170 is positive. Data points 3350, 3360 may not be included in the real-time lookup result because normalized score 3160 is not positively identified as being greater than 500.

FIG. 33 illustrates an aspect of scoring mart 2820 allowing identification of the "speed of change" based scores. As shown in FIG. 33, scores that exhibit a rate of change over time that is faster than a determined criterion may be identified. For example, as identified in FIG. 33, a search for all scores for line of business 3130 of WC and a model 3120 of large loss having a normalized score 3160 with a slope greater than 10 not identified with a holdback 3170 may be performed. The result in this example may include data points 3410, 3420 having identical entity identification 3150 value of 23456. Data point 3410 identifies the normalized score 3160 as a value of 400 on Jun. 1, 2014. Data point 3420 identifies the normalized score 3160 as a value of 700 on Jun. 30, 2014. The slope of entity identification 3150 value of 23456 may be calculated based on the equation:

RISE/RUN=(700−400)/(Jun. 30, 2014−Jun. 1, 2014) =300/29=10.3.

Since a slope of 10.3 is greater than the requested slope of 10, data points 3410, 3420 entity identification 3150 value of 23456 are returned.

FIG. 34 illustrates an aspect of scoring mart 2820 allowing a return of entities with more than one score. As shown in FIG. 34, claims that have a high score on more than one model at a time may be identified. For example, as identified in FIG. 34, a search for all claims for line of business 3130 of WC and a model 3120 of large loss having a normalized score 3160 greater than 500 and a model 3120 of fraud having a normalized score 3160 greater than 600. The result in this example may include data points 3510, 3520 having identical entity identification 3150 value of 23456. Data point 3510 includes a model 3120 of large loss having a normalized score 3160 value of 700 (greater than 500) while data point 3520 includes a model 3120 of fraud having a normalized score 3160 value of 650 (greater than 600).

FIG. 35 illustrates an aspect of scoring mart 2820 allowing the aggregation of scores from one entity onto another entity. As shown in FIG. 35, scores that exhibit a rate of change over time that is faster than a criterion may be referred. For example, as identified in FIG. 35, the normalized score 3160 of data points included in group 3610 is 250, 700, 200, 650, and 300. The average of these normalized scores 3160 is a value of 420 as shown for data point 3620. The average normalized score 3160 of a model 3120 of large loss with entity type 3140 of claims for a given policy in a time period may calculated and that normalized score 3160 may be entered as a score at the policy level, data point 3620. Similarly, although not shown, the average fraud score across all claims for an agent in a time period may be performed and that average score may be inserted as a score at the agency level.

Figure 36:
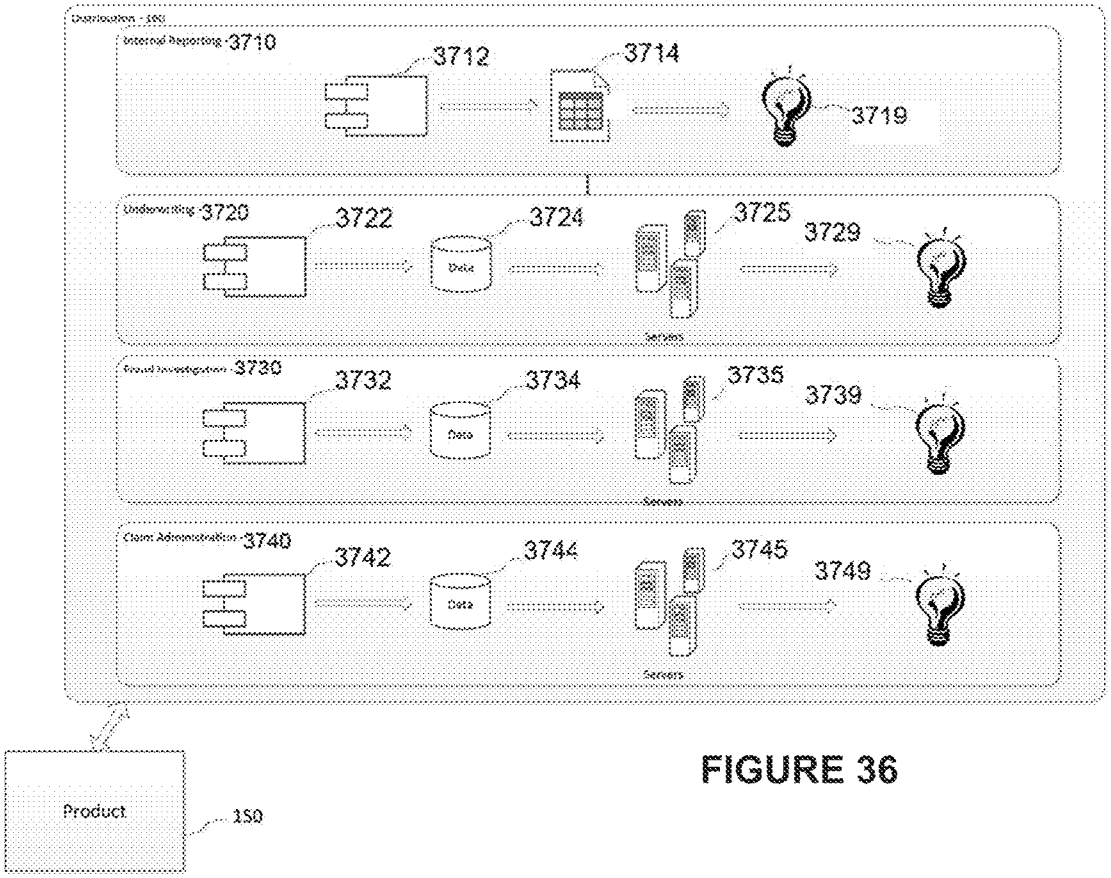
FIG. 36 illustrates the output through distribution.

FIG. 36 illustrates the output through distribution 160. Distribution 160 may include internal reporting 3710, underwriting 3720, fraud investigation 3730, and claims administration 3740.

Internal reporting 3710 may be the external interface to clients of a given business. Internal reporting 3710 may include the web interface portal of a client, for example. Alternatively or additionally, internal reporting 3710 may include representatives that work in offices and interact with potential clients.

Internal reporting 3710 may include a communications interface 3712 for transceiving data from product 150. This data may be included in a format from product 150 such as spreadsheets 3714 and/or other known reporting formats. The internal reporting 3710 may then be used to process an output 3719.

Underwriting 3720, fraud investigation 3730, and claim administration 3740 represent specific systems within a client. These systems include and represent any of a myriad of workflow platforms that may exist in a business or corporate environment. Underwriting 3720 may represent the fraud system within an insurance company. Fraud investigation 3730 may represent the underwriting system found within an insurance company. Claim administration 3740 represents the claims handling system found within an insurance company.

Underwriting 3720 may include an interface 3722 for transceiving information with product 150. This information may then be stored in a storage unit 3724. Processors 3725 may act on the stored data and output underwriting conclusions 3729.

Fraud investigation 3730 may include an interface 3732 for transceiving information with product 150. This information may then be stored in a storage unit 3734. Processors 3735 may act on the stored data and output Fraud conclusions 3739.

Claim administration 3740 may include an interface 3742 for transceiving information with product 150. This information may then be stored in a storage unit 3744. Processors 3745 may act on the stored data and output claim administration 3749.

Figure 37:
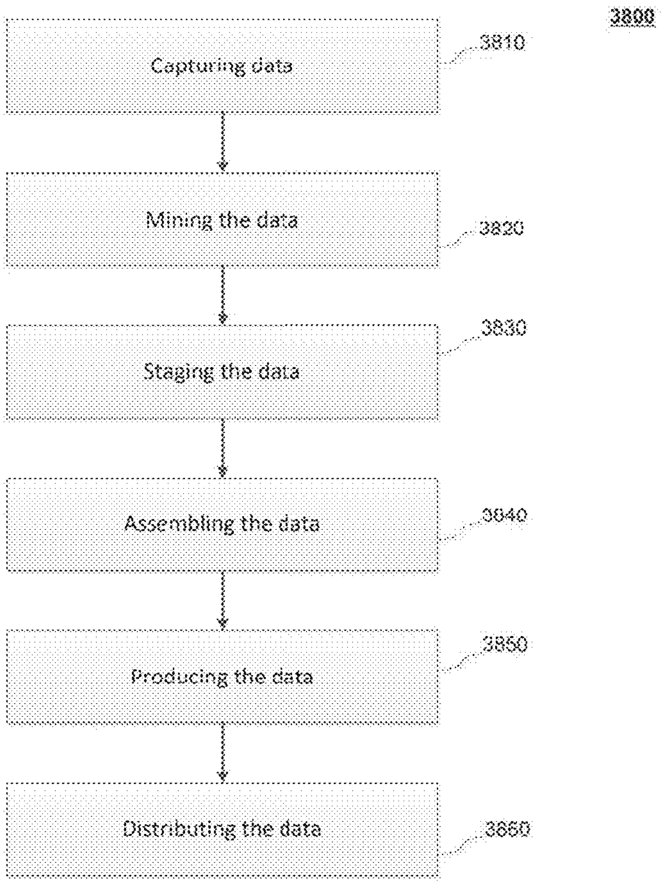
FIG. 37 illustrates a method performed in an insight supply chain.

FIG. 37 illustrates a method 3800 performed in an insight supply chain. Method 3800 includes capturing data at step 3810. This data may be data used within an organization and may be stored within the computer systems of the organization. Data may also include information gleaned during method 3800, for example. This data may be housed within a data warehouse, a data lake, or even provided by a third party.

Method 3800 may also include mining the data at step 3820. The mining of the data 3820 is the heavy industry of determining the contents of the data. Mining the data 3820 may include traditional data mining techniques, machine learning and text mining, for example.

Method 3800 may include staging the data at step 3830. Staging the data may include reorganizing the data to accelerate the use of the data or the analytics performed on the data. This may include an analytical data mart (ADM), an outlier engine, and a text factory. Staging the data at step 3830 is the data management step of method 3800.

Method 3800 may include assembling the data at step 3840. Assembling at step 3840 may include performing analytics on the data.

Method 3800 may include producing the data at step 3850. Producing the data at step 3850 may include reporting the data, including traditional human delivery reporting, or providing the data in a scoring mart.

Method 3800 may include distributing the data at step 3860. Distributing at step 3860 may include reporting the SharePoint or self-help, or providing the information to the myriad of workflow platforms included within the business organization, such as a fraud system, underwriting system, and claims handling system.

As used herein, devices, such as the score mart and outlier engine and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 38:
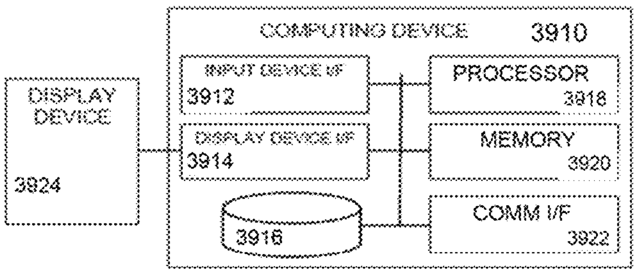
FIG. 38 illustrates an example computing device that may be used to implement features described herein with reference to FIGS. 1-37.

FIG. 38 shows an example computing device 3910 that may be used to implement features describe above with reference to FIGS. 1-28. The computing device 3910 includes a processor 3918, memory device 3920, communication interface 3922, peripheral device interface 3912, display device interface 3914, and storage device 3916. FIG. 38 also shows a display device 3924, which may be coupled to or included within the computing device 3910.

The memory device 3920 may be or include a device such as a Dynamic Random Access Memory (D-RAM), Static RAM (S-RAM), or other RAM or a flash memory. The storage device 3916 may be or include a hard disk, a magneto-optical medium, an optical medium such as a CD-ROM, a digital versatile disk (DVDs), or Blu-Ray disc (BD), or other type of device for electronic data storage.

The communication interface 3922 may be, for example, a communications port, a wired transceiver, a wireless transceiver, and/or a network card. The communication interface 3922 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 3912 may be an interface configured to communicate with one or more peripheral devices. The peripheral device interface 3912 may operate using a technology such as Universal Serial Bus (USB), PS/2, Bluetooth, infrared, serial port, parallel port, and/or other appropriate technology. The peripheral device interface 3912 may, for example, receive input data from an input device such as a keyboard, a mouse, a trackball, a touch screen, a touch pad, a stylus pad, and/or other device. Alternatively or additionally, the peripheral device interface 3912 may communicate output data to a printer that is attached to the computing device 3910 via the peripheral device interface 3912.

The display device interface 3914 may be an interface configured to communicate data to display device 3924. The display device 3924 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 3914 may operate using technology such as Video Graphics Array (VGA), Super VGA (S-VGA), Digital Visual Interface (DVI), High-Definition Multimedia Interface (HDMI), or other appropriate technology. The display device interface 3914 may communicate display data from the processor 3918 to the display device 3924 for display by the display device 3924. As shown in FIG. 38, the display device 3924 may be external to the computing device 3910, and coupled to the computing device 31910 via the display device interface 3914. Alternatively, the display device 3924 may be included in the computing device 3900.

An instance of the computing device 3910 of FIG. 38 may be configured to perform any feature or any combination of features described above as performed. In such an instance, the memory device 3920 and/or the storage device 3916 may store instructions which, when executed by the processor 3918, cause the processor 3918 to perform any feature or any combination of features described above as performed. Alternatively or additionally, in such an instance, each or any of the features described above may be performed by the processor 3918 in conjunction with the memory device 3920, communication interface 3922, peripheral device interface 3912, display device interface 3914, and/or storage device 3916.

Figure 39:
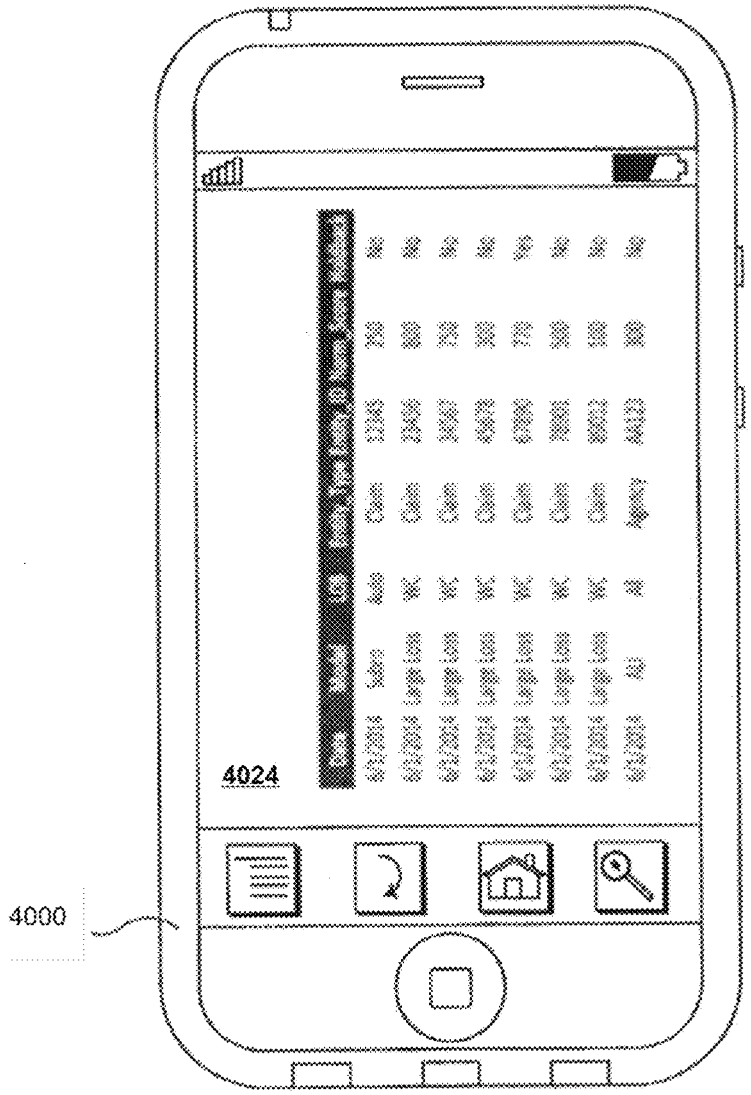
FIG. 39 illustrates a mobile device that is a more specific example of the computing device of FIG. 38.

FIG. 39 shows a mobile device 4000 that is a more specific example of the computing device 3910 of FIG. 38. The mobile device 4000 may include a processor (not depicted), memory device (not depicted), communication interface (not depicted), peripheral device interface (not depicted), display device interface (not depicted), storage device (not depicted), and touch screen display 4024, which may possess characteristics of the processor 3918, memory device 3920, communication interface 3922, peripheral device interface 3912, display device interface 3914, storage device 3916, and display device 3924, respectively, as described above with reference to FIG. 38. The touch screen display 4024 may receive user input using technology such as, for example, resistive sensing technology, capacitive sensing technology, optical sensing technology, or any other appropriate touch-sensing technology. As shown in FIG. 39, the touch screen display 4024 may display a notification/alert document, with characteristics of any or any combination of documents described above with reference to FIGS. 1-38. The touch screen display 4024 may receive input from a user of the mobile device 4000, for filling in a notification/alert document shown in the touch screen display 4024.

Referring again to FIG. 38, an instance of the computing device 3910 may alternatively or additionally be configured to perform any feature or any combination of features described above as performed. In such an instance, the memory device 3920 and/or the storage device 3916 may store instructions which, when executed by the processor 3918, cause the processor 3918 to perform any feature or any combination of features. In such an instance, the processor 3918 may perform the feature or combination of features in conjunction with the memory device 3920, communication interface 3922, peripheral device interface 3912, display device interface 3914, and/or storage device 3916.

Alternatively or additionally, an instance of the computing device 31910 may be configured to perform any feature or any combination of features described above as performed. In such an instance, the memory device 31920 and/or the storage device 3916 may store instructions which, when executed by the processor 3918, cause the processor 3918 to perform any feature or any combination of features described above as performed. In such an instance, the processor 3918 may perform the feature or combination of features in conjunction with the memory device 3920, communication interface 3922, peripheral device interface 3912, display device interface 3914, and/or storage device 3916.

Alternatively or additionally, an instance of the computing device 3910 may be configured to perform any feature or any combination of features described above as performed. In such an instance, the memory device 3920 and/or the storage device 3916 may store instructions which, when executed by the processor 3918, cause the processor 3918 to perform any feature or any combination of features described above as performed. In such an instance, the processor 3918 may perform the feature or combination of features in conjunction with the memory device 3920, communication interface 3922, peripheral device interface 3912, display device interface 3914, and/or storage device 3916.

Although FIG. 38 shows that the computing device 3910 includes a single processor 3918, single memory device 3920, single communication interface 3922, single peripheral device interface 3912, single display device interface 3914, and single storage device 3916, the computing device may include multiples of each or any combination of these components 3918, 3920, 3922, 3912, 3914, 3916, and may be configured to perform, mutatis mutandis, analogous functionality to that described above.

As used to herein, the term "document" broadly refers to and is not limited to a paper document, an electronic file defining a paper document, a social media post, an SMS, an email, or any electronic medium of communication used to deliver a message.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features described above with reference to FIGS. 1-39 are described above as performed using the system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-39 may be used alone without the other features and elements or in various combinations with or without other features and elements. Sub-elements of the methods and features described above with reference to FIGS. 1-39 may be performed in any arbitrary order (including concurrently), in any combination or sub-combination.

What is claimed is:

1. A system enabling streamlined business intelligence, reporting and ad hoc analysis, the system comprising:

at least one processor communicatively coupled to a database, the processor operating with the database to:

process data from at least one of a plurality of data sources by processing dimensional and fact attributes from each of a plurality of data points, wherein the fact attributes are measurable attributes of the data points and the dimensional attributes are descriptors of the fact attributes with the fact attributes being associated with the dimensional attributes, the fact attributes being configured in a first table and the dimensional attributes being configured in a second table, the processing of dimensional and fact attributes from each of a plurality of data points being configured to link the fact attributes back to the data including the plurality of data points from the plurality of data sources, and the processing of dimensional and fact attributes from each of a plurality of data points being configured to provide multiple frames of reference including at least two of people, places, objects, and events, when accessing the first table for one of the multiple frames of reference by providing access to the second table providing descriptors to the accessed first table and access linked provided data including the plurality of data points to provide a framework of data linked to a given fact from at least one frame of reference.

2. The system of claim 1 further comprising determining at least one metric for at least one of the fact attributes and storing the at least one metric with the at least one of the fact attributes in the fact table.

3. The system of claim 1 wherein the processing of the dimensional attributes includes generating an anchor identification for providing a key to link the dimensional attribute to a described related fact.

4. The system of claim 3 wherein the dimensional attributes are processed with Astage processing.

5. The system of claim 1 wherein a plurality of pointers are created from the processing fact attributes, the plurality of pointers linking ones of the fact attributes back to the provided data.

6. The system of claim 1 wherein people include parties and actors, wherein objects include insured properties, automobiles and machinery, wherein events include milestones which happen at points in time, and wherein places include addresses with geographic information.

7. The system of claim 6 wherein the geographic information is at various levels of view.

8. The system of claim 1 wherein the data includes at least two of people, places, objects, and events which provide analytical/business value.

9. The system of claim 1 wherein the at least one of a plurality of data sources includes upstream data sources within a company.

10. The system of claim 1 wherein the fact attribute is a payment amount and the dimensional attribute is a payment type.

11. The system of claim 1 wherein the fact attributes and dimensional attributes are processed and linked using at least one extract transform and load process.

12. A method for enabling analysis of integrated data from multiple perspectives, the method comprising:

processing data from at least one of a plurality of data sources by processing dimensional and fact attributes from each of a plurality of data points, wherein the fact attributes are measurable attributes of the data points and the dimensional attributes are descriptors of the fact attributes with the fact attributes being associated with the dimensional attributes, the fact attributes being configured in a first table and the dimensional attributes being configured in a second table;

linking the fact attributes back to the data including the plurality of data points from the plurality of data sources; and providing multiple frames of reference when accessing the first table for one of the multiple frames of reference including at least two of people, places, objects, and events, by providing access to the second table providing descriptors to the accessed first table and access linked provided data including the plurality of data points to provide a framework of data linked to a given fact from at least one frame of reference.

13. The method of claim 12 wherein the processing of dimensional attributes includes reformatting the dimensional attribute to a common format, comparing the reformatted dimensional attribute and creating an anchor identification, performing Astage processing and combining alike entities.

14. The method of claim 12 wherein the processing of fact attributes includes reformatting the fact attribute, picking an identification population and generating an identifier, performing Astage processing and combining alike entities.

15. The method of claim 12 wherein the data includes at least two of people, places, objects, and events which provide analytical/business value.

16. The method of claim 12 wherein the fact attribute is a payment amount and the dimensional attribute is a payment type.

17. The method of claim 12 wherein the fact attributes and dimensional attributes are processed and linked using at least one extract transform and load process including Astage processing and generating anchor identification.

18. A non-transitory computer readable medium storing a program for enabling analysis of integrated data from multiple perspectives, wherein the program, when executed by a processor, causes the processor to:

process data from at least one of a plurality of data sources by processing dimensional and fact attributes from each of a plurality of data points, wherein the fact attributes are measurable attributes of the data points and the dimensional attributes are descriptors of the fact attributes with the fact attributes being associated with the dimensional attributes, the fact attributes being configured in a first table and the dimensional attributes being configured in a second table;

link the fact attributes back to the data including the plurality of data points from the plurality of data sources; and provide multiple frames of reference when accessing the first table for one of the multiple frames of reference including at least two of people, places, objects, and events, by providing access to the second table providing descriptors to the accessed first table and access linked provided data including the plurality of data points to provide a framework of data linked to a given fact from at least one frame of reference.

19. The computer readable medium of claim 18 wherein the processing of the dimensional attributes includes generating an anchor identification for providing a key to link the dimensional attribute to a described related fact.

20. The computer readable medium of claim 18 wherein a plurality of pointers are created from the processing fact attributes, the plurality of pointers linking ones of the fact attributes back to the provided data.

* * * * *